US009252453B2

(12) United States Patent
Kajiwara

(10) Patent No.: US 9,252,453 B2
(45) Date of Patent: Feb. 2, 2016

(54) RECHARGEABLE BATTERY

(75) Inventor: Kouichi Kajiwara, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 219 days.

(21) Appl. No.: 14/128,983

(22) PCT Filed: Jun. 15, 2012

(86) PCT No.: PCT/JP2012/065343
§ 371 (c)(1),
(2), (4) Date: Dec. 23, 2013

(87) PCT Pub. No.: WO2012/176704
PCT Pub. Date: Dec. 27, 2012

(65) Prior Publication Data
US 2014/0120396 A1    May 1, 2014

(30) Foreign Application Priority Data

Jun. 24, 2011    (JP) ................. 2011-140524

(51) Int. Cl.
| H01M 2/26 | (2006.01) |
| H01M 10/04 | (2006.01) |
| H01M 2/30 | (2006.01) |
| H01M 4/70 | (2006.01) |

(52) U.S. Cl.
CPC .......... *H01M 10/0431* (2013.01); *H01M 2/263* (2013.01); *H01M 2/30* (2013.01); *H01M 4/70* (2013.01); *H01M 2220/20* (2013.01)

(58) Field of Classification Search
None
See application file for complete search history.

(56) References Cited

U.S. PATENT DOCUMENTS

| 8,828,589 | B2 * | 9/2014 | Tozuka ................. | H01M 2/263 429/161 |
| 8,889,292 | B2 * | 11/2014 | Kim ....................... | H01M 2/18 429/211 |
| 2012/0258342 | A1 * | 10/2012 | Tstsumi ................. | H01G 11/66 429/94 |

FOREIGN PATENT DOCUMENTS

| JP | 2000-150306 A | 5/2000 |
| JP | 2003-346771 A | 12/2003 |
| JP | 2005-216825 A | 8/2005 |
| JP | 2006-228551 A | 8/2006 |
| JP | 2009-026705 A | 2/2009 |
| JP | 2010-257945 A | 11/2010 |
| JP | 2011-171286 A | 9/2011 |
| JP | 2011-192517 A | 9/2011 |
| WO | 2010/001975 A1 | 1/2010 |
| WO | WO 2010001975 | * 1/2010 |

(Continued)

*Primary Examiner* — Jonathan Crepeau
(74) *Attorney, Agent, or Firm* — Volpe and Koenig, P.C.

(57) ABSTRACT

A rechargeable battery includes a battery pack, a battery lid, and an electrode and an external terminal connected by an electricity connector. A laminated portion of the electrodes comprising a lump of wound electrodes is separated into two bundle electrode connecting portions from a center side of the wound electrodes in the thickness direction outward of the battery pack. The electricity collector is provided with a main plate joined to the bundles, a rib plate bent from the main plate and extending outward of the battery pack, a mounting plate extending along the inside of the battery lid, and a connecting plate bent from of the mounting plate and extending toward a bottom surface of the battery pack. A coupling plate is inclined from this bottom end of the connecting plate toward the bundles and is coupled to one end of a joint plate on the battery lid side.

15 Claims, 17 Drawing Sheets

(56) References Cited

FOREIGN PATENT DOCUMENTS

| WO | 2010/147136 A1 | 12/2010 |
| WO | WO 2012023392 * | 2/2012 |
| WO | 2012/086427 A1 | 6/2012 |

* cited by examiner

RECHARGEABLE BATTERY

TECHNICAL FIELD

The present invention relates to a rechargeable battery mounted on vehicles such as hybrid electric vehicles or pure electric vehicles.

BACKGROUND ART

A square rechargeable battery including a lump of flat electrodes formed by winding an electrode of an anode which is a foil of an anode coated with an active synthetic material of the anode and an electrode of a cathode which is a foil of a cathode coated with an active synthetic material of the cathode via a separator, electrolyte accommodated in a square battery container, and an external terminal electrically connected to the lump of the flat electrodes is widely known as a battery for driving vehicles (see PTL 1).

At one end portion of the lump of the flat electrodes in a direction of a wound center axis, an anode uncoated portion from which the foil of the anode is exposed without being coated with the active synthetic material of the anode is laminated, and at the other end portion in the direction of the wound center axis of the lump of the flat electrodes, a cathode uncoated portion from which the foil of the cathode is exposed without being coated with the active synthetic material of the cathode is laminated.

In PTL 1, a structure in which an electricity collector having a substantially V-shape in cross section is inserted into the interior of the lump of the flat electrodes, the uncoated laminated portion of the lump of the flat electrodes is divided into two parts and bundled respectively, and the respective bundles are connected to the electricity collector is proposed.

CITATION LIST

Patent Literature

PTL 1: JP-A-2005-216825

SUMMARY OF INVENTION

Technical Problem

Since a rechargeable battery mounted on a vehicle is subjected to vibrations and impacts, an electricity collector configured to hold a lump of electrodes needs to be prevented from being deformed.

In a square battery described in PTL 1, an anode electricity collector is formed with a connecting strip extending upright from one end portion of one of joint plates portions, and the connecting strip is joined to a connecting strip suspending from one end portion of a lead plate connected to an external terminal by spot welding. A cathode electricity collector is formed with a connecting strip bent from one end portion of one of the joint plate portions toward the other joint plate portion and extending longwise outward of one end thereof so as to protrude therefrom, and the connecting strip is connected to the lead plate. The lead plate is disposed inner surface of a case, the connecting portion is bent into an L-shape from upper and lower ends thereof, the connecting portion at the upper end is joined to a sealing plate, which constitutes a cathode external terminal by spot welding or the like, and the lower connecting portion is joined to the connecting strip of the cathode electricity collector by spot welding or the like.

In the square battery described in PTL 1, since a pair of the joint plates of the electricity collector and the lead plate are not integrally coupled, the electricity collector or the lead plate may be subjected to deformation when a vibration or an impact is applied.

Since the lump of the electrodes is held in the battery container in a state of being jointed to the electricity collector, the probability of deformation of the electricity collector is increased with increase in mass of the lump of the electrodes. A great capacity is required for the rechargeable battery mounted on a vehicle, and the mass of the lump of the electrodes tends to increase, so that improvement of rigidity of the electricity collector is demanded.

Solution to Problem

According to a first aspect of the present invention, there is provided a rechargeable battery including: a lump of flat electrodes formed by winding an electrode of the anode and an electrode of the cathode by the intermediary of a separator; a battery pack configured to accommodate the lump of the flat electrodes; a battery lid configured to seal the battery pack; an anode external terminal and a cathode external terminal provided on the battery lid; an anode electricity collector configured to connect the electrode of the anode and the anode external terminal; and a cathode electricity collector configured to connect the electrode of the cathode and the cathode external terminal, wherein laminated portions of the electrode of the anode and the electrode of the cathode at both end portions of the lump of the flat electrodes in a direction of a wound center axis are each separated into two bundle electrode connecting portions from a center side of the thickness direction of the lump of the flat electrodes outward of the battery pack, the anode electricity collector and the cathode electricity collector each include: a pair of joint plates each including a main plate having an electricity collector joint surface to be joined to each of electrode joint surfaces provided on the separated two bundle electrode connecting portions and a rib plate bent from the main plate and extend outward of the battery pack; a mounting plate extending along an inner surface of the battery lid; a pair of connecting plates bent from side portions of the mounting plate and extending toward a bottom surface of the battery pack; and a pair of coupling plates each configured to connect each one of the pair of connecting plates and each one of the pair of joint plates, wherein the each one of the pair of coupling plates inclines from one end of the each one of the pair of connecting plates on the bottom surface side of the battery pack toward a center of the lump of the flat electrodes in the thickness direction, simultaneously extends toward the bottom surface of the battery pack, and is coupled to one end of each of the pair of joint plates on the battery lid side.

In the rechargeable battery of the first aspect, according to a second aspect of the present invention, preferably, the coupling plate includes a coupling surface having three bent sides, is continued to one end of the connecting plate on a first bent side, and is continued to a main plate and a rib plate of the joint plate respectively on a second bent side and a third bent side.

In the rechargeable battery of the second aspect, according to a third aspect of the present invention, preferably, a boundary between the main plate and the rib plate on the coupling surface side corresponds to a fourth bent side, the second, third, and fourth bent sides intersect each other at a point apart from the connecting plate toward the center of the lump of the flat electrodes in the thickness direction by a predetermined distance and also apart from one end of the connecting plate toward the bottom surface of the battery pack by a predetermined distance, and the second, third, and fourth bent sides form a Y-shape in side view.

In the rechargeable battery of the second or third aspect, according to a fourth aspect of the present invention, preferably the first bent side is provided so as to form a predetermined angle with the direction of wound center axis of the lump of the flat electrodes, the first bent sides of the pair of coupling plates provided on each of the anode electricity collector and the cathode electricity collector are provided so that the first bent sides of the pair of the coupling plates interest each other in side view.

In the rechargeable battery of any one of the first to fourth aspects, according to a fifth aspect, reinforcing plates configured to couple the main plates and the rib plates are preferably provided at the end portions of the anode electricity collector and the cathode electricity collector on the bottom surface side of the battery pack.

In the rechargeable battery of any one of the first to fifth aspects, according to a sixth aspect, preferably, the anode electricity collector is connected to the anode external terminal on the other end side of the connecting plate, and the cathode electricity collector is connected to the cathode external terminal on the other end side of the connecting plate.

Advantageous Effect of the Invention

According to the present invention, deformation of the electricity collector caused by vibrations or impacts applied to the rechargeable battery is prevented so that a rechargeable battery superior in vibration resistance and impact resistance may be provided.

DESCRIPTION OF EMBODIMENTS

Figure 1:
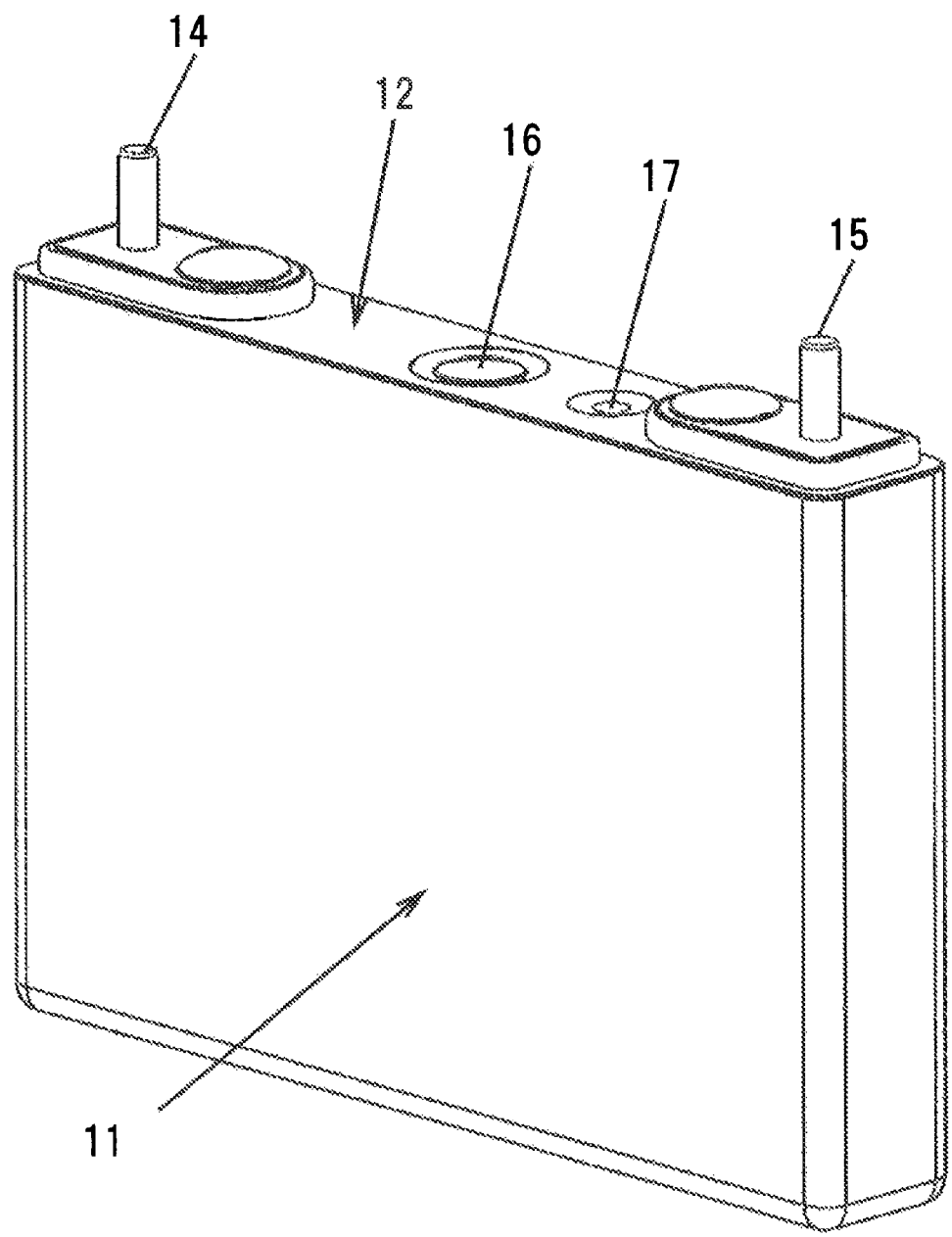
FIG. 1 is a perspective view illustrating an appearance of a rechargeable battery according to a first embodiment of the present invention.

Referring now to the drawings, embodiments in which a rechargeable battery of the present invention is applied to a square lithium ion battery will be described.
—First Embodiment—

Figure 2:
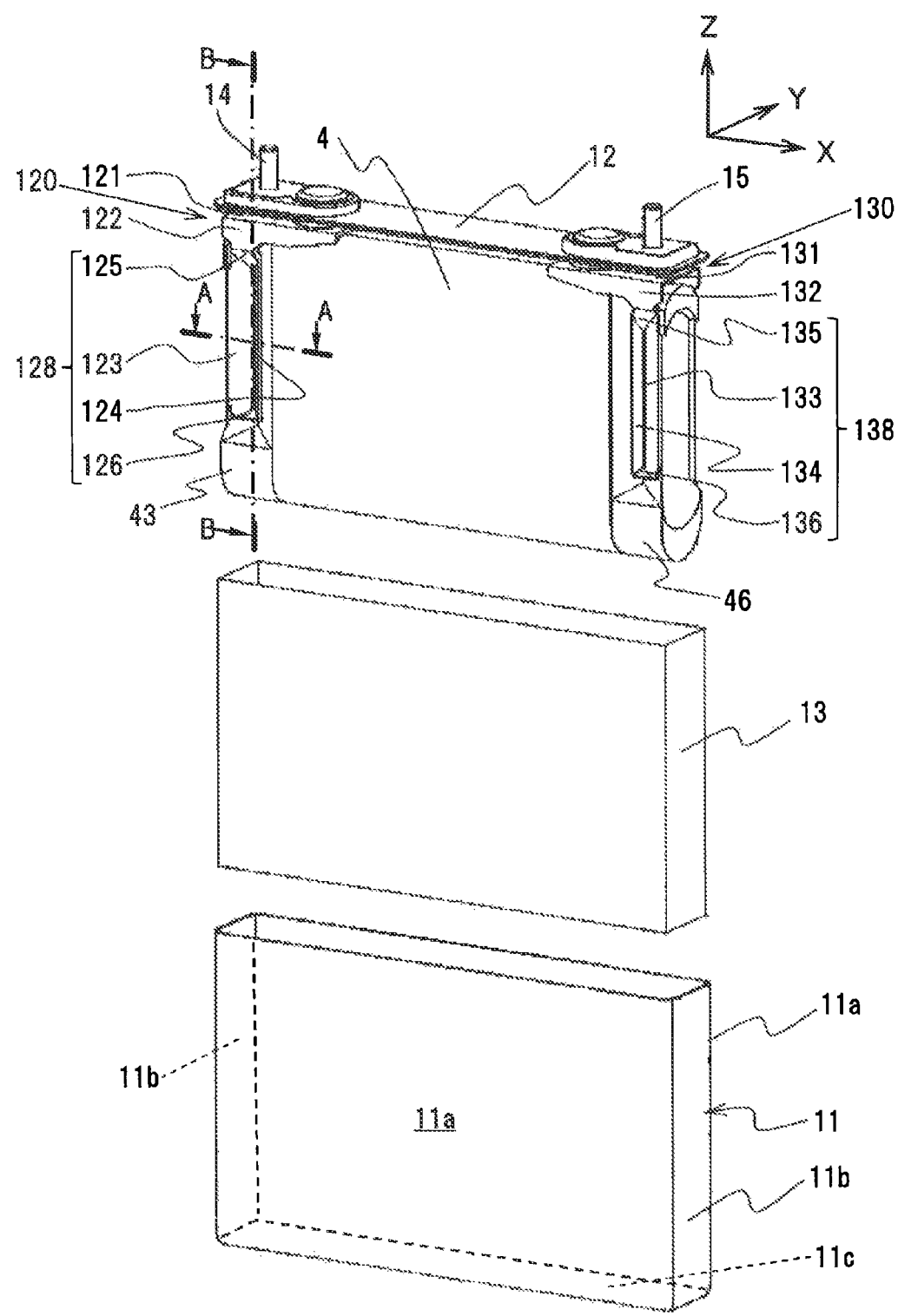
FIG. 2 is an exploded perspective view illustrating a configuration of the rechargeable battery of FIG. 1.

FIG. 1 is a perspective view illustrating an appearance of a rechargeable battery. FIG. 2 is an exploded perspective view illustrating a configuration of the rechargeable battery. In FIG. 2, illustration of a gas discharge valve 16 and a liquid filling portion 17 is omitted.
[Battery Container]

As illustrated in FIG. 1, the rechargeable battery includes a battery container having a thin square shape including a battery pack 11 and a battery lid 12. As illustrated in FIG. 2, the battery pack 11 is formed into a square box shape configured to accommodate a lump of the wound electrodes 4, includes a pair of wide surfaces 11a, a pair of narrow surfaces 11b, and a bottom surface 11c, and is opened on top. The lump of the wound electrodes 4 is joined to an anode electricity collector 120 and a cathode electricity collector 130 connected to the battery lid 12 by ultrasonic joint or the like before being accommodated in the battery pack 11.

The lump of the wound electrodes 4 is accommodated in the battery pack 11 in a state of being covered with a bag-shaped insulating sheet 13. Accordingly, a bottom surface and side surfaces of the battery pack 11 are electrically insulated from the lump of the wound electrodes 4. The battery lid 12 has a square flat panel shape, and is welded so as to close the opening of the battery pack 11 to seal the battery pack 11.
[Liquid Filling Portion and Gas Discharge Valve]

As illustrated in FIG. 1, the battery lid 12 is provided with the liquid filling portion. The liquid filling portion 17 is formed with a liquid filling hole for filling the interior of the battery container with electrolyte. The filling hole is sealed with a liquid filling plug after having filled with the electrolyte. The battery lid 12 is provided also with the gas discharge valve 16. The gas discharge valve 16 is formed by partly thinning the battery lid 12 by press work. The gas discharge valve 16 is configured to be burst when gas is generated by heat caused by the rechargeable battery due to abnormality such as overcharge, the pressure in the battery container rises, and reaches a predetermined pressure, whereby the gas in the interior is discharged to lower the pressure in the battery container.
[External Terminal]

As illustrated in FIG. 1 and FIG. 2, the battery lid 12 is provided with an anode external terminal 14 and a cathode external terminal 15. As illustrated in FIG. 2, the anode external terminal 14 and the cathode external terminal 15 are connected to the anode electricity collector 120 and the cathode electricity collector 130 disposed in the battery pack 11, respectively by caulking. The anode external terminal 14, the anode electricity collector 120, the cathode external terminal 15, and the cathode electricity collector 130 are electrically insulated from the battery lid 12 by insulating materials (not shown) respectively.

The anode external terminal 14 and the anode electricity collector 120 are both formed of aluminum, and the cathode external terminal 15 and the cathode electricity collector 130 are both formed of copper. The anode electricity collector 120 and the cathode electricity collector 130 are joined to an electrode of the anode 43 and an electrode of the cathode 46 of the lump of the wound electrodes 4 respectively.

The anode external terminal 14 is electrically connected to the electrode of the anode 43 of the lump of the wound electrodes 4 via the anode electricity collector 120, and the cathode external terminal 15 is electrically connected to the electrode of the cathode 46 of the lump of the wound electrodes 4 via the cathode electricity collector 130. Therefore, electric power is supplied to an external load via the anode external terminal 14 and the cathode external terminal 15, and externally generated power is supplied to the lump of the wound electrodes 4 via the anode external terminal 14 and the cathode external terminal 15 and is charged thereto.

Although not illustrated, an assembled battery including a plurality of rechargeable batteries is formed by arranging a plurality of rechargeable batteries in parallel and electrically connecting the anode external terminal 14 and the cathode external terminal 15 of the adjacent rechargeable batteries by a has bar formed of a metallic plate member. Parts of the anode external terminal 14 and the cathode external terminal 15 exposed to the outside of the battery container are formed with male screws respectively, and the has bar is connected to the anode external terminal 14 and the cathode external terminal 15 by nuts.

[Lump of Wound Electrodes]

Figure 3:
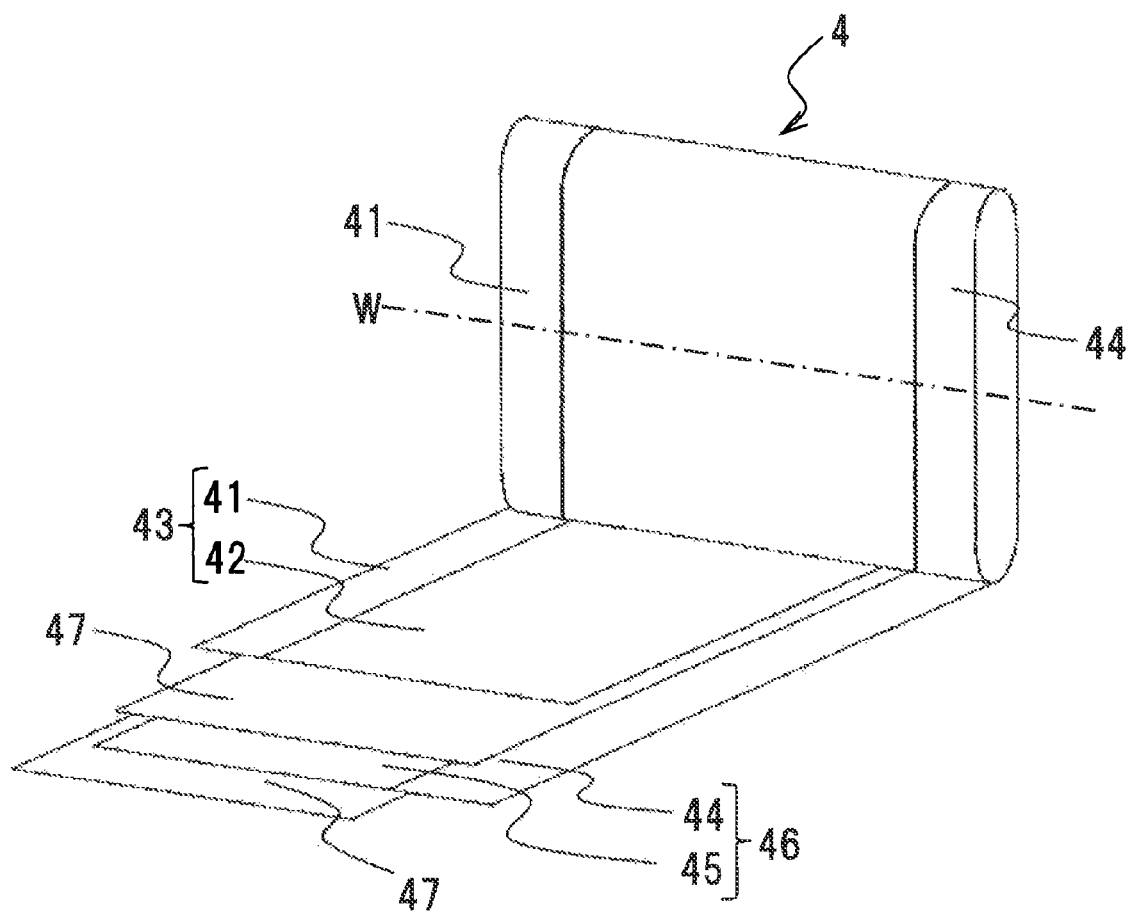
FIG. 3 is a perspective view illustrating a lump of wound electrodes of the rechargeable battery of FIG. 1.

Referring now to FIG. 3, the lump of the wound electrodes 4 will be described. FIG. 3 is a perspective view of the lump of the wound electrodes 4. As illustrated in FIG. 3, the lump of the wound electrodes 4 has a laminated structure formed by flatly winding an electrode of the anode 43 and an electrode of the cathode 46 both having a band shape around a wound center axis W by the intermediary of a separator 47 therebetween.

The electrode of the anode 43 includes a band-shaped foil of the anode 41 and an active synthetic material layer of the anode 42 formed by being coated with an active synthetic material of the anode on both surfaces of the foil of the anode 41. The electrode of the cathode 46 includes a foil of the cathode 44 and an active synthetic material layer of the cathode 45 formed by being coated with an active synthetic material of the cathode on both surfaces of the foil of the cathode 44. The foil of the anode 41 is an aluminum foil having a thickness on the order of 20 μm, and the foil of the cathode 44 is formed of a copper foil having a thickness on the order of 15 μm. The material of the separator 47 is porous polyethylene resin.

One of both end portions of the lump of the wound electrodes 4 in a direction of the wound center axis W, that is, in a direction orthogonal to the winding direction corresponds to a laminated portion of the electrode of the anode 43, and the other one of those corresponds to a laminated portion of the electrode of the cathode 46. The laminated portion of the electrode of the anode 43 provided on the one end is a lamination of uncoated anode portion having no active synthetic material layer of the anode 42 formed thereon, that is, of exposed portion of the foil of the anode 41. The laminated portion of the electrode of the cathode 46 provided on the other end is a lamination of uncoated cathode portion having no active synthetic material layer of the cathode 45, that is, of exposed portion of the foil of the cathode 44.

Figure 8:
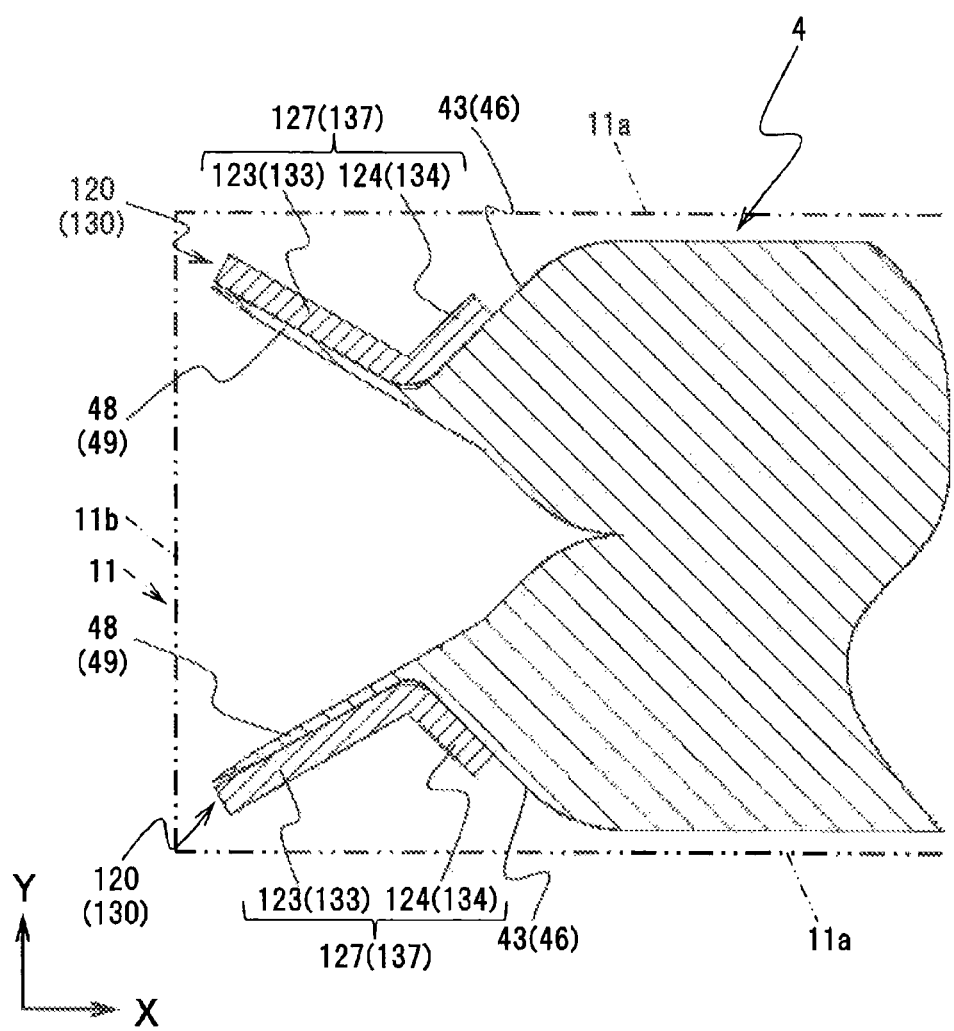
FIG. 8 is a cross-sectional view taken along the line A-A in FIG. 2.

FIG. 8 is a cross-sectional view taken along the line A-A of FIG. 2, and the battery pack 11 is illustrated schematically by a doubled-dot chain line. Although FIG. 8 illustrates a configuration of the anode side, reference numerals of components on the cathode side are also added in parentheses for the sake of convenience because the cathode side has the same configuration. The laminated portion of the electrode of the anode 43 is collapsed in advance at one end portion of the lump of the wound electrodes 4 in the direction of the wound center axis W illustrated in FIG. 3, and is separated into two bundle electrode connecting portions 48 by being divided from a center side of the thickness direction of the lump of the wound electrodes 4 toward the wide surfaces 11a of the battery pack 11, that is, outward of the battery pack 11 as illustrated in FIG. 8. In the same manner, the laminated portion of the electrode of the cathode 46 is collapsed in advance at the other end portion of the lump of the wound electrodes 4 in the direction of the wound center axis W illustrated in FIG. 3, and is separated into two bundle electrode connecting portions 49 by being divided from a center side of the thickness direction of the lump of the wound electrodes 4 toward the both wide surfaces 11a of the battery pack 11, that is, outward of the battery pack 11 as illustrated in FIG. 8.

Figure 10:
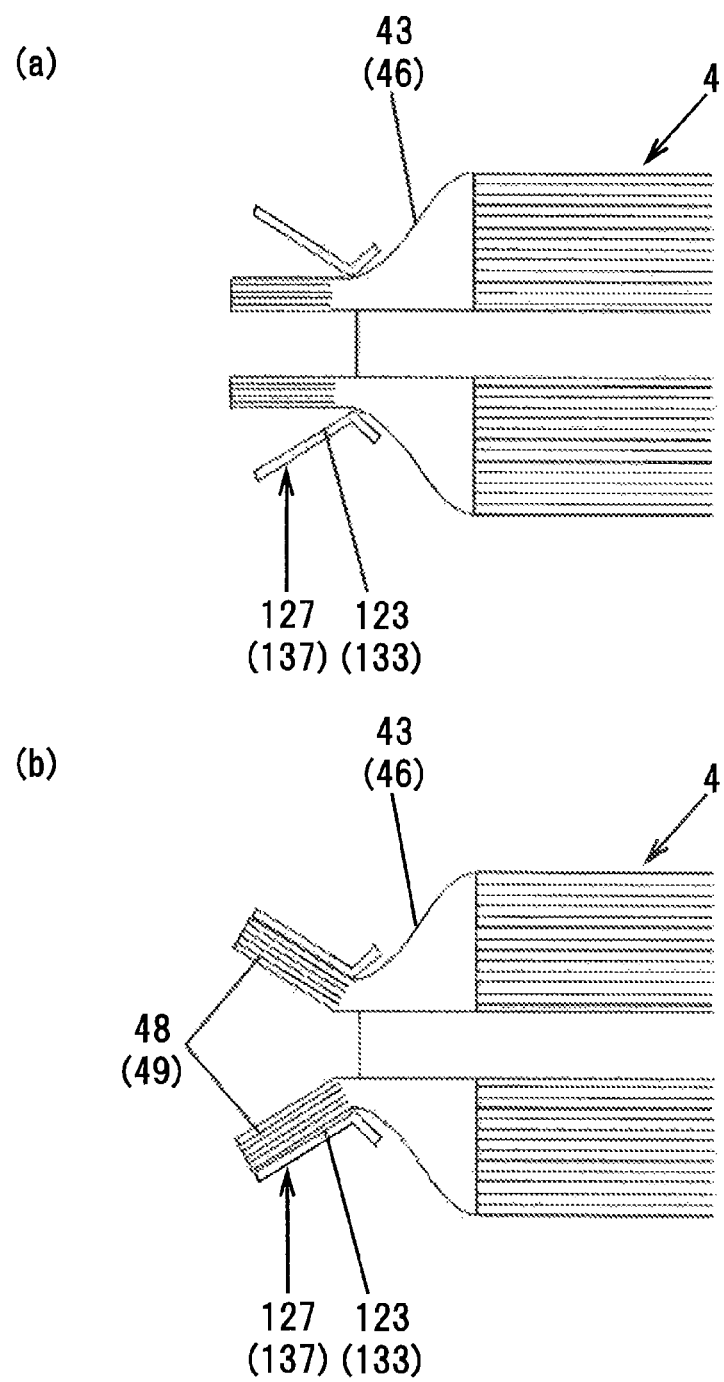
FIG. 10 is a schematic plan view for illustrating a process of forming bundle electrode connecting portions at an end portion of the lump of the wound electrodes.

The bundle electrode connecting portions 48, 49 of the lump of the wound electrodes 4 are formed in a manner given below. FIG. 10 is a schematic plan view for explaining a process of forming a bundle electrode connecting portion at an end portion of the lump of the wound electrodes 4. FIG. 10(a) is a schematic drawing illustrating a state in which the laminated portion of the electrode of the anode 43 of the lump of the wound electrodes 4 is inserted between a pair of joint plates 127 provided on the anode electricity collector 120 described later. FIG. 10(b) is schematic drawing illustrating a state in which the inserted laminated portion of the electrode of the anode 43 of the lump of the wound electrodes 4 is divided from the inside to the outside so as to separate into two parts. Although FIG. 10 illustrates a configuration of the anode side, reference numerals of components on the cathode side are also added in parentheses for the sake of convenience because the cathode side has the same configuration.

As illustrated in FIG. 10(a), the laminated portion of the electrode of the anode 43 of the lump of the wound electrodes 4 is deformed in advance by collapsing in the thickness direction prior to unification of the lump of the wound electrodes 4 and the anode electricity collector 120. Subsequently, the collapsed laminated portion of the electrode of the anode 43 is inserted between the pair of joint plates 127, and the laminated portion of the electrode of the anode 43 is arranged inside of a pair of main plates 123 which constitute the pair of joint plates 127.

After the lump of the wound electrodes 4 has been inserted between the pair of joint plates 127 of the anode electricity collector 120, the electrode of the anode 43 is divided into a V-shape outward from the inside thereof so that the inner surfaces of the main plates 123 of the anode electricity collector 120 come into contact with the outer surfaces of the laminated portions of the electrode of the anode 43 as illustrated in FIG. 10(b).

By dividing outward into the V-shape, the laminated portion is separated into a pair of the bundle electrode connecting portions 48 and hence a space for joint in which an ultrasonic oscillation horn can be inserted is formed between the pair of the bundle electrode connecting portions 48. The pair of bundle electrode connecting portions 48 are inclined so as to extend outward, respectively, and are provided with electrode joint surfaces to be joined to the anode electricity collector 120 on the outsides thereof.

In the same manner, as illustrated in FIG. 10(a), the laminated portion of the electrode of the cathode 46 of the lump of the wound electrodes 4 is deformed in advance by collapsing in the thickness direction prior to unification of the lump of the wound electrodes 4 and the cathode electricity collector 130. Subsequently, the collapsed laminated portion of the electrode of the cathode 46 is inserted between a pair of joint plates 137, and the laminated portion of the electrode of the cathode 46 is arranged inside of a pair of main plates 133 which constitute the pair of the joint plates 137.

After the lump of the wound electrodes 4 has been inserted between the pair of joint plates 137 of the cathode electricity collector 130, the electrode of the cathode 46 is divided into a V-shape outward from the inside thereof so that the inner surfaces of the main plates 133 of the cathode electricity collector 130 come into contact with the outer surfaces of the laminated portions of the electrode of the cathode 46 as illustrated in FIG. 10(b).

By dividing outward into the V-shape, the laminated portion is separated into a pair of the bundle electrode connecting portions 49 and hence a space for joint in which an ultrasonic oscillation horn can be inserted is formed between the pair of the bundle electrode connecting portions 49. The pair of bundle electrode connecting portions 49 are inclined so as to extend outward, respectively, and are provided with electrode joint surfaces to be joined to the cathode electricity collector 130 on the outsides thereof.

As illustrated in FIG. 8, on the anode side, the separated two bundle electrode connecting portions 48 are connected, by ultrasonic joint to the main plates 123 which constitute the joint plates 127 of the anode electricity collector 120 on respective surfaces thereof on the side of the both wide surfaces 11a of the battery pack 11. On the cathode side, the separated two bundle electrode connecting portions 49 are connected, by ultrasonic joint to the main plates 133 which constitute the joint plates 137 of the cathode electricity collector 130 on respective surfaces thereof on the side of the both wide surfaces 11a of the battery pack 11.

[Anode Electricity Collector and Cathode Electricity Collector]

Referring now to FIG. 2, and FIG. 4 to FIG. 9, structures of the anode electricity collector 120 and the cathode electricity collector 130 will be described. As illustrated in FIG. 2, a direction of the wound center axis W (see FIG. 3) of the lump of the wound electrodes 4 is defined to be an X-direction, a direction of the thickness of the lump of the wound electrodes 4 orthogonal to the X-direction is defined as a Y-direction, and a direction of the height (vertical direction) of the lump of the wound electrodes 4 orthogonal to the X-direction and the Y-direction is defined as a Z-direction.

Figure 4:
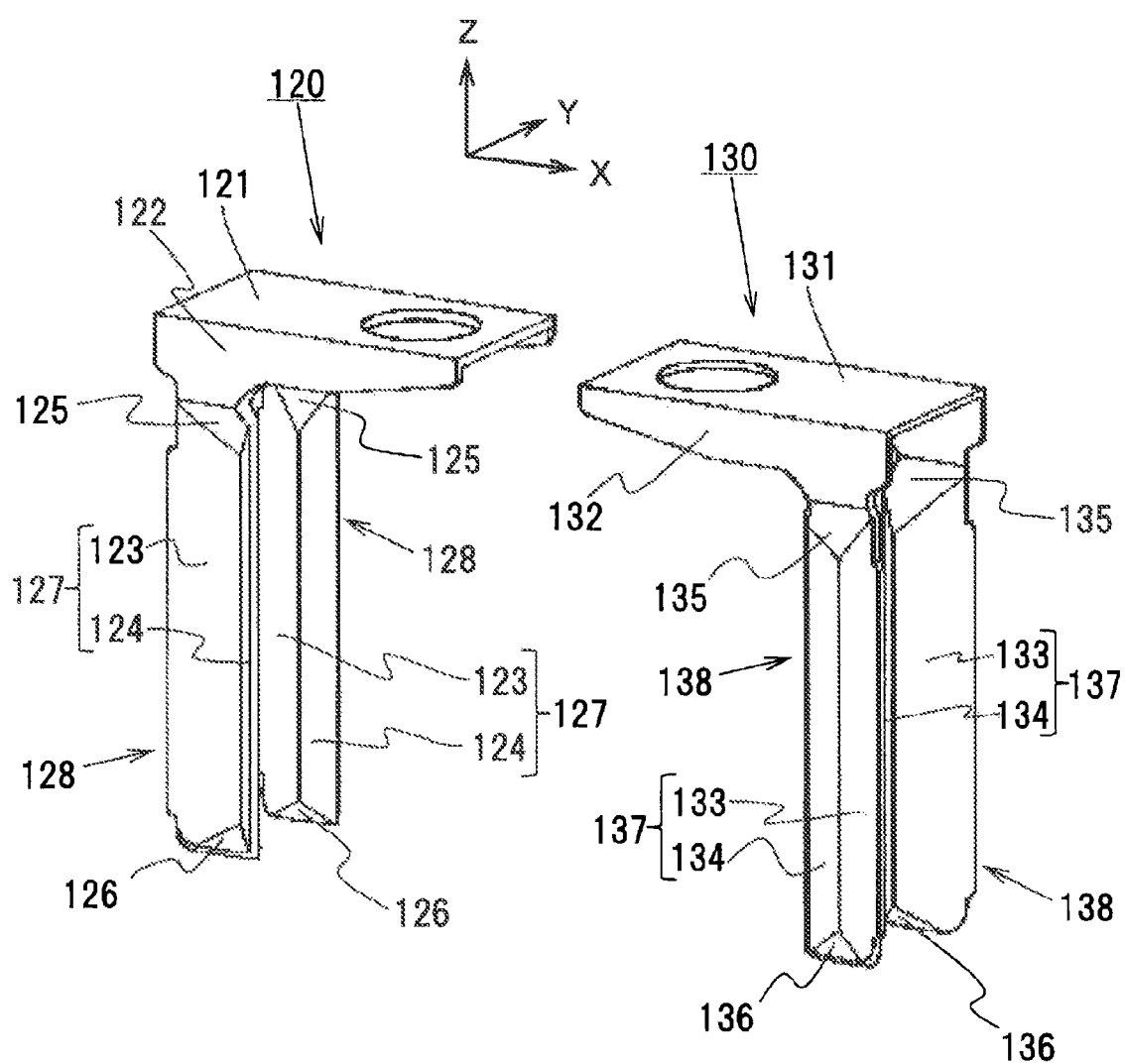
FIG. 4 is a perspective view illustrating an anode electricity collector and a cathode electricity collector of the rechargeable battery of FIG. 1.
Figure 5:
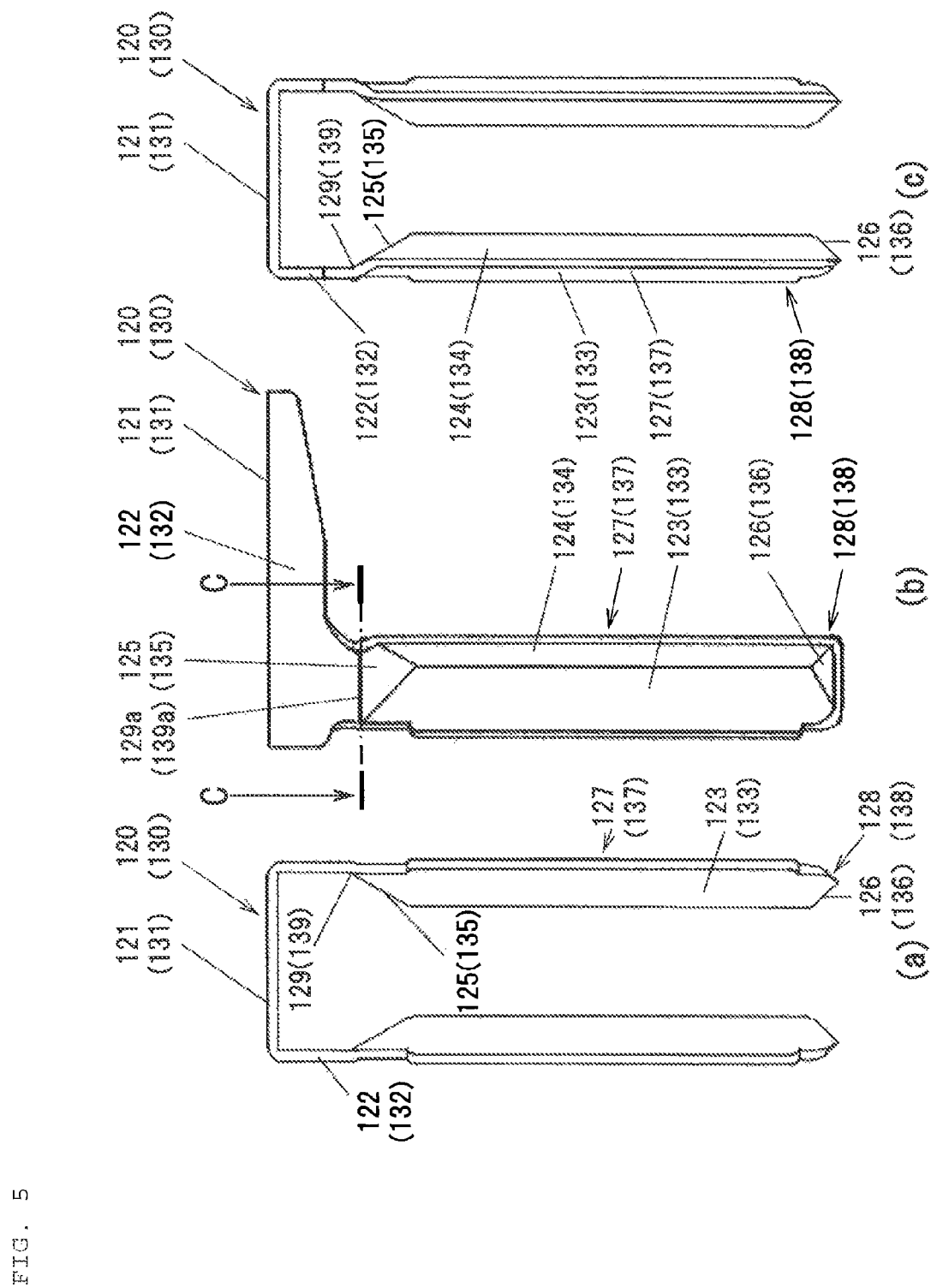
FIG. 5(a) is a left side view of the electricity collector.
FIG. 5(b) is a front view of the electricity collector.
FIG. 5(c) is a right side view of the electricity collector.

FIG. 4 is a perspective view illustrating the anode electricity collector 120 and the cathode electricity collector 130 of the rechargeable battery. FIG. 5(a) is a left side view of the anode electricity collector 120, FIG. 5(b) is a front view of the anode electricity collector 120, and FIG. 5(c) is a right side view of the anode electricity collector 120. The anode electricity collector 120 and the cathode electricity collector 130 are different in material, but have the same shape. Therefore, although a configuration of the anode electricity collector 120 is illustrated in FIG. 5, reference numerals of components of the cathode electricity collector 130 are also added in parentheses for the sake of convenience.

As illustrated in FIG. 4 and FIG. 5, the anode electricity collector 120 includes a square flat panel-shaped mounting plate 121 to which the anode external terminal 14 is connected, a pair of connecting plate 122 bent and extending downward from a long side portion of the mounting plate 121, and raising portions 128 extending from one end sides of the pair of connecting plate 122 toward the bottom surface 11c side of the battery pack 11 at a predetermined width. In the same manner, the cathode electricity collector 130 includes a square flat panel-shaped mounting plate 131 to which the cathode external terminal 15 is connected, a pair of connecting plates 132 bent and extending downward from long side portions of the mounting plate 131, and raising portions 138 extending from one end slides of the pair of connecting plates 132 toward the bottom surface 11c side of the battery pack 11 at a predetermined width.

The mounting plates 121, 131 are disposed so as to come into contact with an inner surface of the battery lid 12 via an insulating material (not illustrated) so as to extend along the inner surface of the battery lid 12 respectively. The mounting plate 121 is formed with an opening for allowing mounting of the anode external terminal 14, and the mounting plate 131 is formed with an opening for allowing mounting of the cathode external terminal 15.

Figure 6:
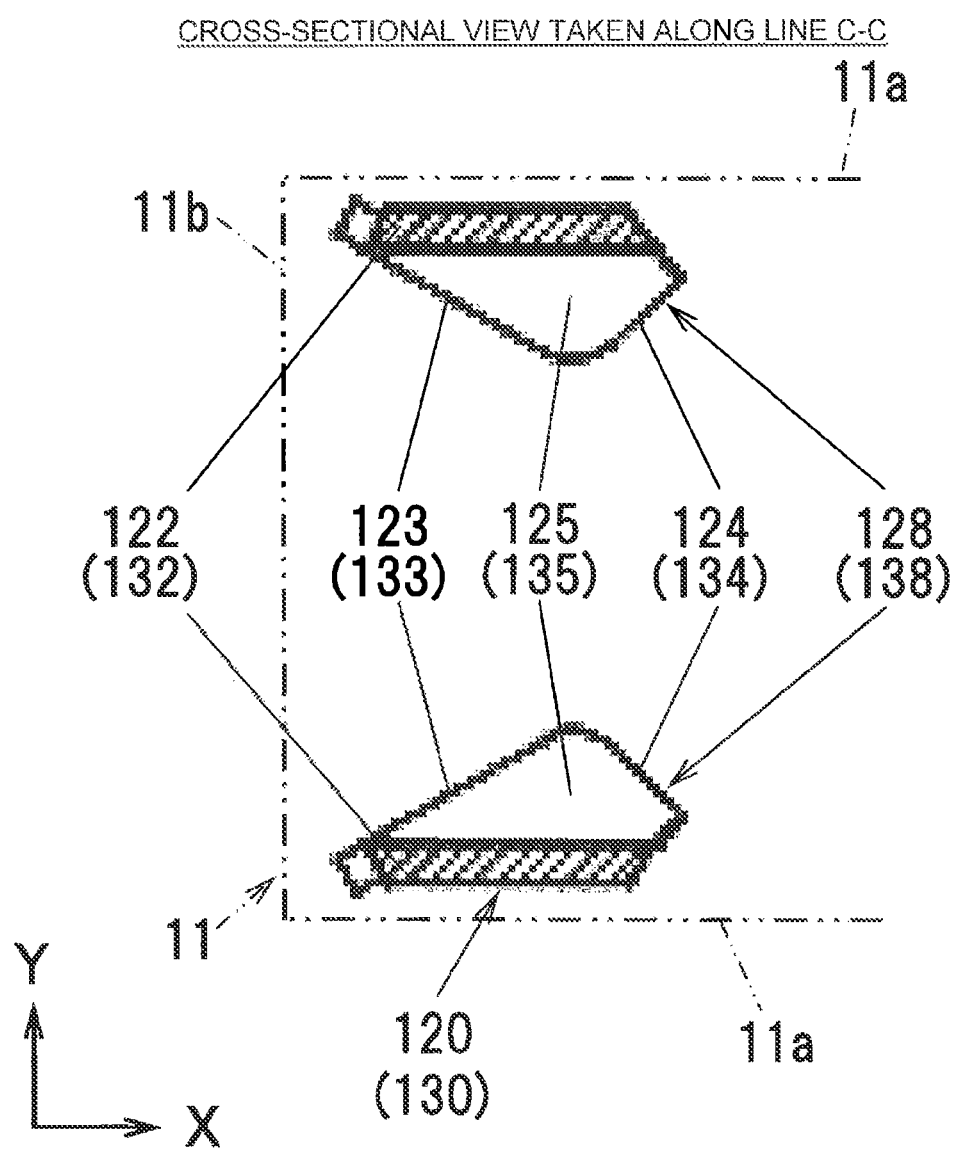
FIG. 6 is a cross-sectional view taken along the line C-C in FIG. 5(b).
Figure 7:
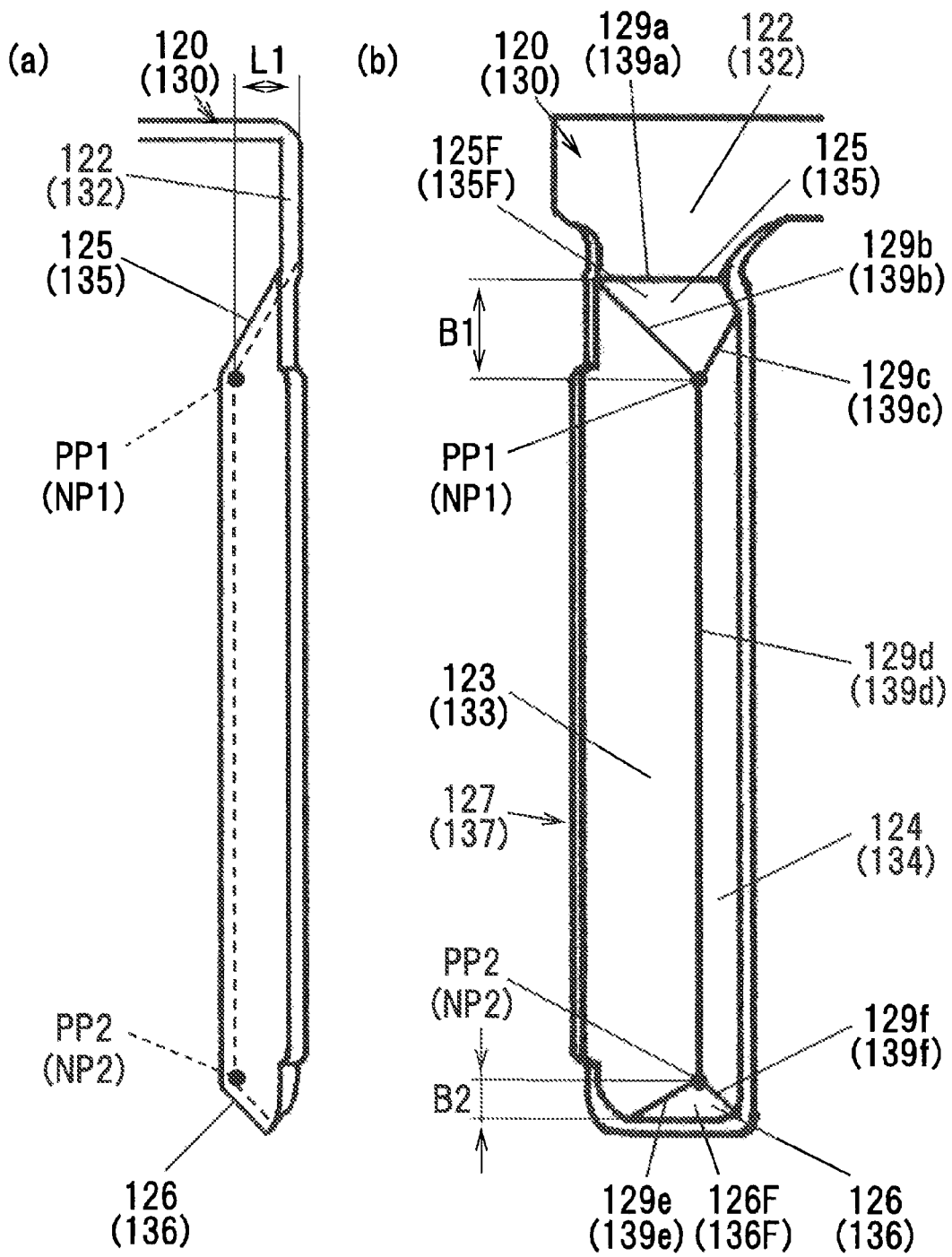
FIG. 7(a) is a partly enlarged view of FIG. 5(a)
FIG. 7(b) is a partly enlarged view of FIG. 5(b).
Figure 9:
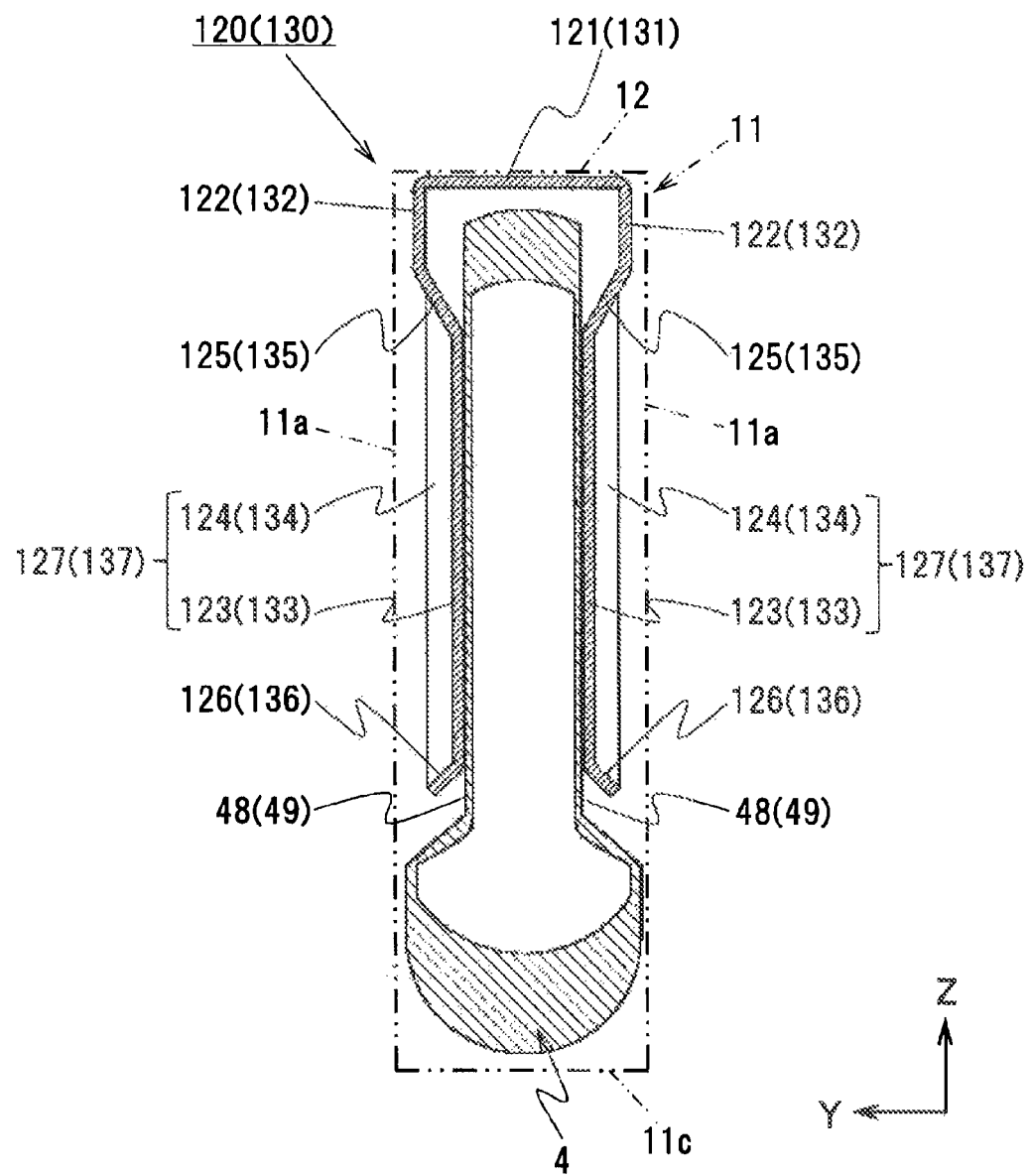
FIG. 9 is a cross-sectional view taken along the line B-B in FIG. 2.

FIG. 6 is a cross-sectional view taken along the line C-C of FIG. 5(b), and the battery pack 11 is illustrated schematically by a doubled-dot chain line. FIG. 9 is a cross-sectional view taken along the line B-B of FIG. 2, and the battery pack 11 and the battery lid 12 are illustrated schematically by a doubled-dot chain line. Although FIG. 6 and FIG. 9 illustrate a configuration of the anode side, reference numerals of components on the cathode side are also added in parentheses for the sake of convenience because the cathode side has the same configuration.

As illustrated in FIG. 2, FIG. 4 to FIG. 6 and FIG. 9, the pair of connecting plates 122 of the anode electricity collector 120 are bent at a substantially right angle at the mounting plate 121 on the both wide surfaces 11a sides of the battery pack 11 and extend therefrom along the both wide surfaces 11a of the battery pack 11 toward the bottom surface 11c of the battery pack 11 so as to cover the bent ends of the lump of the wound electrodes 4 respectively.

In the same manner, the pair of connecting plates 132 of the cathode electricity collector 130 are bent at a substantially right angle at the mounting plate 131 on the both wide surfaces 11a sides of the battery pack 11 and extend therefrom along the both wide surfaces 11a of the battery pack 11 toward the bottom surface 11c of the battery pack 11 so as to cover the bent ends of the lump of the wound electrodes 4 respectively.

As illustrated in FIG. 4 to FIG. 6 and FIG. 9, each of a pair of the raising portions 128 of the anode electricity collector 120 is formed by a raising process on the basis of press work so as to project from the wide surfaces 11a side of the battery pack 11 toward the center in the thickness direction of the lump of the wound electrodes 4, and is formed into a shape in which a surface on the wide surfaces 11a side of the battery pack 11 is depressed.

In the same manner, each of the pair of raising portions 136 of the cathode electricity collector 130 is formed by a raising process on the basis of press work so as to project from the wide surfaces 11a side of the battery pack 11 toward the center in the thickness direction of the lump of the wound electrodes 4, and is formed into a shape in which a surface on the wide surfaces 11a side of the battery pack 11 is depressed.

Each of the pair of the raising portions 128 of the anode electricity collector 120 includes the joint plate 127, a coupling plate 125, and a reinforcing plate 126 as illustrated in FIG. 4. The joint plate 127 has an L-shape in cross-section (see FIG. 8) formed by the main plate 123 and a rib plate 124 extending in the Z-direction (the direction of the height of the lump of the wound electrodes 4). The coupling plate 125 couples the connecting plate 122 to the main plates 123 and the rib plate 124. The reinforcing plate 126 couples the main plate 123 and the rib plate 124 at an end portion thereof on the bottom surface 11c side of the battery pack 11.

In the same manner, each of the pair of the raising portions 138 of the cathode electricity collector 130 includes the joint plate 137, a coupling plate 135, and a reinforcing plate 136 as illustrated in FIG. 4. The joint plates 137 each have an L-shape in cross-section (see FIG. 8) formed by the main plate 133 and a rib plate 134 extending in the Z-direction (the direction of the height of the lump of the wound electrodes 4). The coupling plate 135 couples the connecting plate 132 to the main plates 133 and the rib plate 134. The reinforcing plate 136 couples the main plates 133 and the rib plate 134 at an end portion thereof on the bottom surface 11c side of the battery pack 11.

As illustrated in FIG. 8 and FIG. 9, the pair of the main plates 123 which constitute the pair of joint plates 127 of the anode electricity collector 120 respectively include electricity city collector joint surfaces to be joined to the respective electrode joint surfaces of the bundle electrode connecting portions 48 separated into two parts on the both wide surfaces 11a sides of the battery pack 11. Each of the pair of rib plates 124 which constitute the pair of joint plates 127 of the anode electricity collector 120 is bent at a long side end portion, which is an end portion of the main plates 123 on the side of the center of the lump of the wound electrodes 4, and extending toward the both wide surfaces 11a of the battery pack 11, that is, outward of the battery pack 11. In this manner, with the main plates 123 and the rib plate 124 formed into an L-shape in cross section, rigidity with respect to impacts or vibrations applied in the X-direction and the Y-direction may be enhanced. Although the rib plates 124 are in contact with the laminated portions of the electrode of the anode 43 in FIG. 8, being in contact is not necessarily required.

In the same manner, as illustrated in FIG. 8, FIG. 9, the pair of the main plates 133 which constitute the pair of joint plates 137 of the cathode electricity collector 130 respectively include electricity collector joint surfaces to be joined to the respective electrode joint surfaces of the bundle electrode connecting portions 49 separated into two parts on the both wide surfaces 11a sides of the battery pack 11. Each of the pair of rib plates 134 which constitute the pair of joint plates 137 of the cathode electricity collector 130 is bent at a long side end portion, which is an end portion of the main plates 133 on the side of the center of the lump of the wound electrodes 4, and extending toward the both wide surfaces 11a of the battery pack 11, that is, outward of the battery pack 11. In this manner, with the main plates 133 and the rib plate 134 formed into an b-shape in cross section, rigidity with respect to impacts or vibrations applied in the X-direction and the Y-direction may be enhanced. Although the rib plates 134 are in contact with the laminated portions of the electrode of the cathode 46 in FIG. 8, being in contact is not necessarily required.

As illustrated in FIG. 6 and FIG. 8, the pair of main plates 123 of the anode electricity collector 120 are inclined so as to reduce the distance between the main plates 123 as it goes from the narrow surfaces 11b sides of the battery pack 11 toward the center side of the lump of the wound electrodes 4 in X-Y plane. The pair of rib plates 124 of the anode electricity collector 120 are inclined so as to increase the distance between the rib plates 124 as it goes from the narrow surfaces 11b sides of the battery pack 11 toward the center side of the lump of the wound electrodes 4 in X-Y plane.

In the same manner, as illustrated in FIG. 6 and FIG. 8, the pair of main plates 133 of the cathode electricity collector 130 are inclined so as to reduce the distance between the main plates 133 as goes from the narrow surfaces 11b sides of the battery pack 11 toward the center side of the lump of the wound electrodes 4 in X-Y plane. The pair of rib plates 134 of the cathode electricity collector 130 are inclined so as to increase the distance between the rib plates 134 as it goes from the narrow surfaces 11b sides of the battery pack 11 toward the center side of the lump of the wound electrodes 4 in X-Y plane.

As it in FIG. 4, FIG. 5, and FIG. 9, each of the pair of coupling plates 125 of the anode electricity collector 120 is inclined from one end of the each of the pair of connecting plates 122 on the bottom surface 11c side of the battery pack 11 toward the center of the lump of the wound electrodes 4 in the thickness direction and, simultaneously, extends toward the bottom surface 11c of the battery pack 11. Each of the pair of the coupling plates 125 of the anode electricity collector 120 is coupled to one end of each of the pair of the joint plates 127 on the battery lid 12 side. Accordingly, rigidity with respect to impacts or vibrations applied in the Y-direction and the Z-direction is enhanced in comparison with a case where the coupling plates are bent at a right angle from the connecting plates 122.

In the same manner, as illustrated in FIG. 4, FIG. 5, and FIG. 9, each of the pair of coupling plates 135 of the cathode electricity collector 130 is inclined from one end of the each of the pair of connecting plates 132 on the bottom surface 11c side of the battery pack 11 toward the center of the lump of the wound electrodes 4 in the thickness direction and, simultaneously, extends toward the bottom surface 11c of the battery pack 11. Each of the pair of the coupling plates 135 of the cathode electricity collector 130 is coupled to one end of each of the pair of the joint plates 137 on the battery lid 12 side. Accordingly, rigidity with respect to impacts or vibrations applied in the Y-direction and the Z-direction is enhanced in comparison with a case where the coupling plates are bent at a right angle from the connecting plates 132.

As illustrated in FIG. 4, FIG. 5, and FIG. 9, each of the pair of reinforcing plates 126 of the anode electricity collector 120 is inclined from an end portion of the anode electricity collector 120 on the bottom surface 11c side of the battery pack 11 toward the center of the lump of the wound electrodes 4 in the thickness direction and, simultaneously, extends toward the battery lid 12. Each of the pair of the reinforcing plates 126 of the anode electricity collector 120 is coupled to end portions of the main plate 123 and the rib plate 124 of each of the pair of joint plates 127 on the bottom surface 11c side of the battery pack 11.

In the same manner, as illustrated in FIG. 4, FIG. 5, and FIG. 9, each of the pair of reinforcing plates 136 of the cathode electricity collector 130 is inclined from an end portion of the cathode electricity collector 130 on the bottom surface 11c side of the battery pack 11 toward the center of the lump of the wound electrodes 4 in the thickness direction and, simultaneously, extends toward the battery lid 12. Each of the pair of the reinforcing plates 136 of the cathode electricity collector 130 is coupled to end portions of the main plate 133 and the rib plate 134 of each of the joint plates 137 on the bottom surface 11c side of the battery pack 11.

FIG. 7(a) is a partly enlarged view of FIG. 5(a), and FIG. 7(b) is a partly enlarged view of FIG. 5(b). The coupling plates 125 of the anode electricity collector 120 each include a substantially triangular-shaped coupling surface 125F having a first bent side 129a, a second bent side 129b, and a third bent side 129c. Each of the coupling plates 125 of the anode electricity collector 120 continues to one end of the connecting plate 122 on the first bent side 129a, continues to the main plate 123 of the joint plate 127 on the second bent side 129b, and continues to the rib plate 124 of the joint plate 127 on the third bent side 129c.

In the same manner, the coupling plates 135 of the cathode electricity collector 130 each include a substantially triangular-shaped coupling surface 135F having a first bent side 139a, a second bent side 139b, and a third bent side 139c. Each of the coupling plates 135 of the cathode electricity collector 130 continues to one end of the connecting plates 132 on the first bent side 139a, continues to the main plate 133 of the joint plates 137 on the second bent side 139b, and continues to the rib plate 134 of the joint plate 137 on the third bent side 139c.

The boundary between the main plate 123 and the rib plate 124 on the side of the coupling surface 125F of the anode electricity collector 120 corresponds to a fourth bent side 129d, and the main plate 123 and the rib plate 124 are continued on the fourth bent side 129d.

In the same manner, the boundary between the main plate 133 and the rib plate 134 on the side of the coupling surface 135F of the cathode electricity collector 130 corresponds to a fourth bent side 139d, and the main plate 133 and the rib plate 134 are continued on the fourth bent side 139d.

The first bent side 129a of the anode electricity collector 120 is provided in the X-direction, that is, parallel to the direction of the wound center axis. The second bent side 129b, the third bent side 129c, and the fourth bent side 129d of the anode electricity collector 120 intersect each other at a point PP1 apart from the connecting plates 122 toward the center of the lump of the wound electrodes 4 in the thickness direction by a predetermined distance L1, and apart from one end of the connecting plates 122 toward the bottom surface 11c of the battery pack 11 by a predetermined distance B1. Accordingly, the second bent side 129b, the third bent side 129c, and the fourth bent side 129d form a Y-shape in side view as illustrated in FIG. 7(b).

At the same time, the first bent side 139a of the cathode electricity collector 130 is provided in the X-direction, that is, parallel to the direction of the wound center axis. The second bent side 139b, the third bent side 139c, and the fourth bent side 139d of the cathode electricity collector 130 intersect each other at a point NP1 apart from the connecting plates 132 toward the center of the lump of the wound electrodes 4 by the predetermined distance L1 in the thickness direction, and apart from one end of the connecting plates 132 toward the bottom surface 11c of the battery pack 11 by the predetermined distance B1. Accordingly, the second bent side 139b, the third bent side 139c, and the fourth bent side 139d form a Y-shape in side view as illustrated in FIG. 7(b).

Each of the reinforcing plates 126 of the anode electricity collector 120 is provided with a triangular reinforcing surface 126F including a fifth bent side 129e, a sixth bent side 129f, and an end side connecting the fifth bent side 129e and the sixth bent side 129f. Each of the reinforcing plates 126 of the anode electricity collector 120 continues to the main plate 123 of the joint plate 127 on the fifth bent side 129e and continues to the rib plate 124 of the joint plate 127 on the sixth bent side 129f.

In the same manner, each of the reinforcing plates 136 of the cathode electricity collector 130 is provided with a triangular reinforcing plate 136F including a fifth bent side 139e, a sixth bent side 139f, and an end side connecting the fifth bent side 139e and the sixth bent side 139f. Each of the reinforcing plates 136 of the cathode electricity collector 130 continues to the main plate 133 of the joint plate 137 on the fifth bent side 139e and continues to the rib plate 134 of the joint plate 137 on the sixth bent side 139f.

The fifth bent side 129e, the sixth bent side 129f, and the fourth bent side 129d of the anode electricity collector 120 intersect each other at a point PP2 apart from the connecting plates 122 toward the center of the lump of the wound electrodes 4 by the predetermined distance L1 in the thickness direction, and apart from an end portion of the anode electricity collector 120 on the bottom surface 11c side of the battery pack toward the battery lid 12 by a predetermined distance B2. Accordingly, the fifth bent side 129e, the sixth bent side 129f, and the fourth bent side 129d form an inverted Y-shape in side view as illustrated in FIG. 7(b).

In the same manner, the fifth bent side 139e, the sixth bent side 139f, and the fourth bent side 139d of the cathode electricity collector 130 intersect each other at a point NP2 apart from the connecting plates 132 toward the center of the lump of the wound electrodes 4 by the predetermined distance L1 in the thickness direction, and apart from an end portion of the cathode electricity collector 130 on the bottom surface 11c side of the battery pack toward the battery lid 12 by the predetermined distance B2. Accordingly, the fifth bent side 139e, the sixth bent side 139f, and the fourth bent side 139d form an inverted Y-shape in side view as illustrated in FIG. 7(b).

According to the embodiment described above, the following advantageous effects are achieved.

(1) The anode electricity collector 120 is provided with the pair of coupling plates 125 each configured to couple each of the pair of joint plates 127 having the main plate 123 to be joined to the bundle electrode connecting portion 48 and the rib plate 124 bent from the main plate 123 and extending therefrom, and each of the pair of connecting plates 122 extending from the mounting plate 121 along the inner surface of the battery lid 12 to the bottom surface 11c of the battery pack 11. Since the joint plates 127 and the connecting plates 122 are coupled three-dimensionally by the coupling plates 125, the anode electricity collector 120 improves the rigidity with respect to the vibrations and the impacts in the X, Y, and Z-directions, and deformation of the anode electricity collector 120 caused by the vibrations and the impacts added to the rechargeable battery may be prevented.

In the same manner, the cathode electricity collector 130 is provided with the pair of coupling plates 135 each configured to couple each of the pair of joint plates 137 having the main plate 133 to be joined to the bundle electrode connecting portion 49 and the rib plate 134 bent from the main plate 133 and extending therefrom, and each of the pair of connecting plates 132 extending from the mounting plate 131 along the inner surface of the battery lid 12 to the bottom surface 11c of the battery pack 11. Since the joint plates 137 and the connecting plates 132 are coupled three-dimensionally by the coupling plates 135, the cathode electricity collector 130 improves the rigidity with respect to the vibrations and the impacts in the X, Y, and Z-directions, and deformation of the cathode electricity collector 130 caused by the vibrations and the impacts added to the rechargeable battery may be prevented.

Consequently, the rechargeable battery superior in vibration resistance and impact resistance may be provided.

(2) The raising portion 128 including the coupling plate 125, the main plates 123, the rib plate 124, and the reinforcing plate 126 may be formed integrally by raising process on the basis of press work, and hence the anode electricity collector 120 may be manufactured at low costs. In the same manner, the raising portion 138 including the coupling plate 135, the main plates 133, the rib plate 134, and the reinforcing plate 136 may be formed integrally by raising process on the basis of press work, and hence the cathode electricity collector 130 may be manufactured at low costs.

—Second Embodiment—

Figure 11:
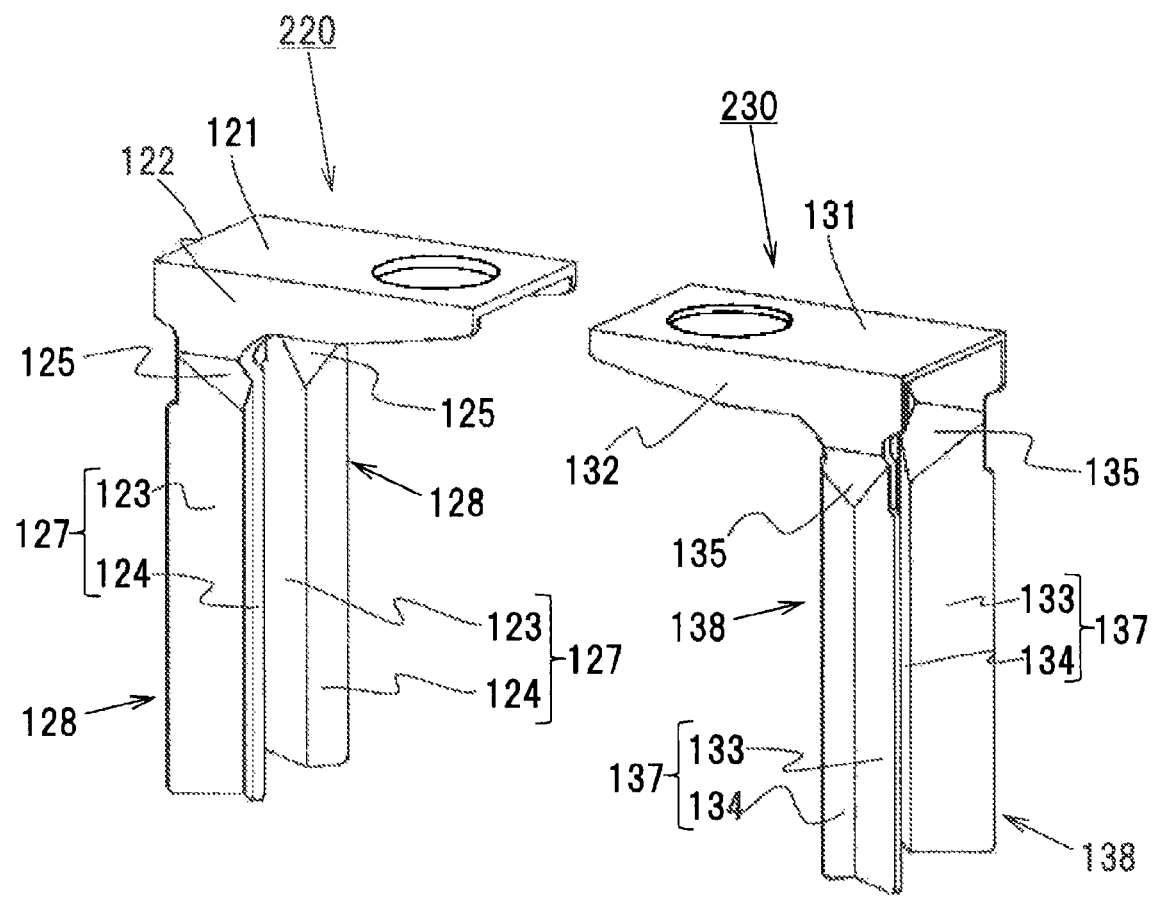
FIG. 11 is a perspective view illustrating an anode electricity collector and a cathode electricity collector of a rechargeable battery according to a second embodiment of the present invention.
Figure 12:
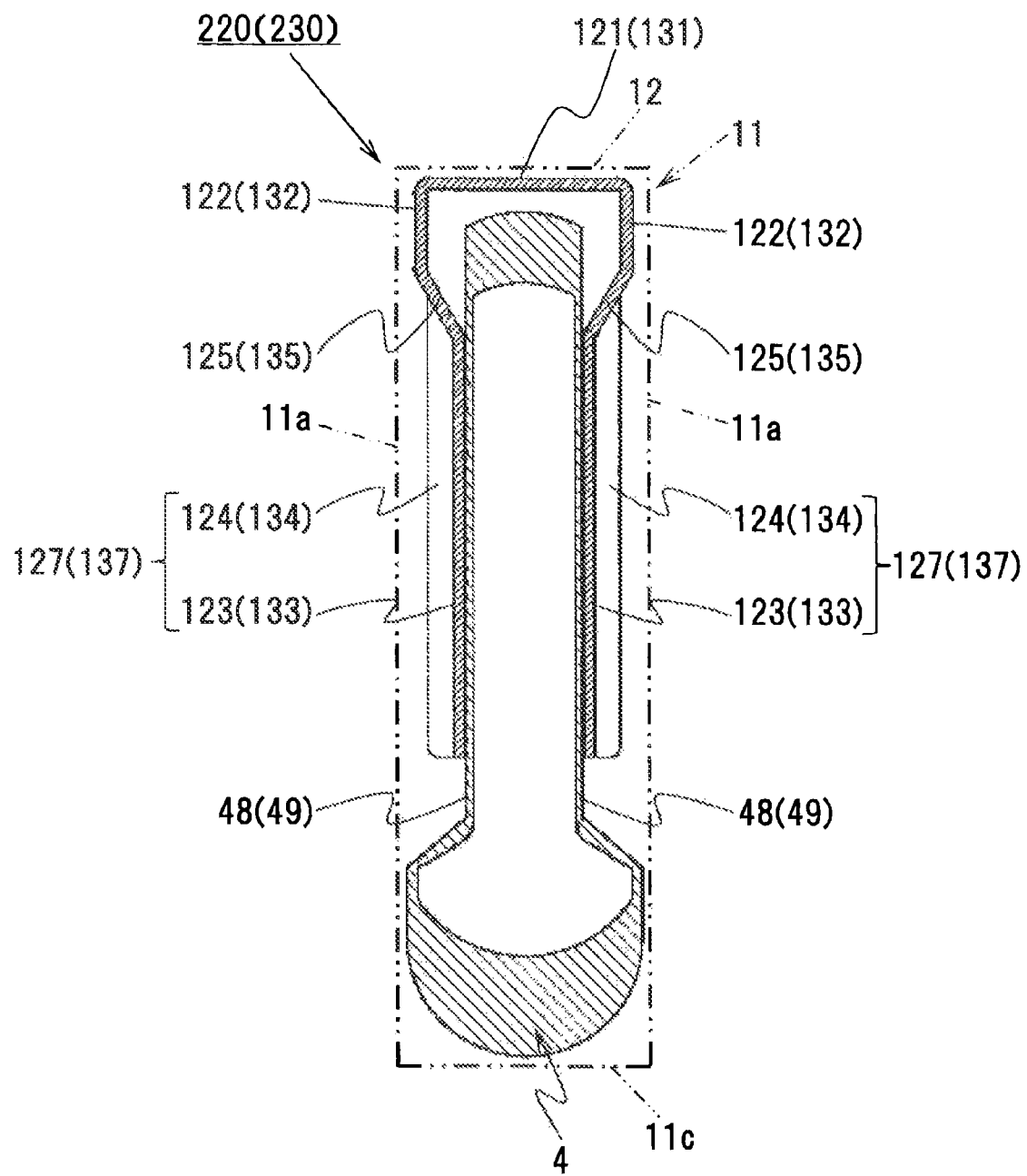
FIG. 12 is a cross-sectional side view illustrating an electricity collector and a lump of the wound electrodes of the rechargeable battery according to the second embodiment of the present invention.

Referring now to FIG. 11 and FIG. 12, a rechargeable battery according to a second embodiment will be described. In the drawing, the same or corresponding portions as the first embodiment are designated by the same reference signs, and description will be omitted. Hereinafter, points different from the first embodiment will be described in detail.

FIG. 11 is a perspective view illustrating an anode electricity collector 220 and a cathode electricity collector 230 of the rechargeable battery according to the second embodiment of the present invention. FIG. 12 is a cross-sectional side view illustrating the anode electricity collector 220 and the lump of the wound electrodes 4 of the rechargeable battery according to the second embodiment of the present invention and corresponds to FIG. 9. Although a configuration of the anode electricity collector 220 is illustrated in FIG. 12, reference numerals of components of the cathode electricity collector 230 are also added in parentheses for the sake of convenience.

As illustrated in FIG. 4 and FIG. 9, in the first embodiment, the reinforcing plates 126 configured to couple the main plates 123 and the rib plates 124 are provided at the end portion of the anode electricity collector 120 on the bottom surface 11c side of the battery pack 11. In the first embodiment, the reinforcing plates 136 configured to couple the main plates 133 and the rib plates 134 are provided at the end portion of the cathode electricity collector 130 on the bottom surface 11c side of the battery pack 11. In contrast, as illustrated in FIG. 11 and FIG. 12, the reinforcing plates 126, 136 are omitted in the second embodiment.

According to the second embodiment, the same effects of the first embodiment are achieved. In addition, in the second embodiment, since the reinforcing plates 126, 136 need not to be formed, the anode electricity collector 220 and the cathode electricity collector 230 may be manufactured at lower costs than the first embodiment. Accordingly, reduction in cost of the rechargeable battery is achieved. The second embodiment is effective in a case where the mass of the lump of the wound electrodes 4 is lighter than that of the first embodiment, and sufficient rigidity is achieved by coupling the main plates 123, 133, the rib plates 124, 134, and the connecting plates 122, 132 by the coupling plates 125, 135, respectively.

—Third Embodiment—

Figure 13:
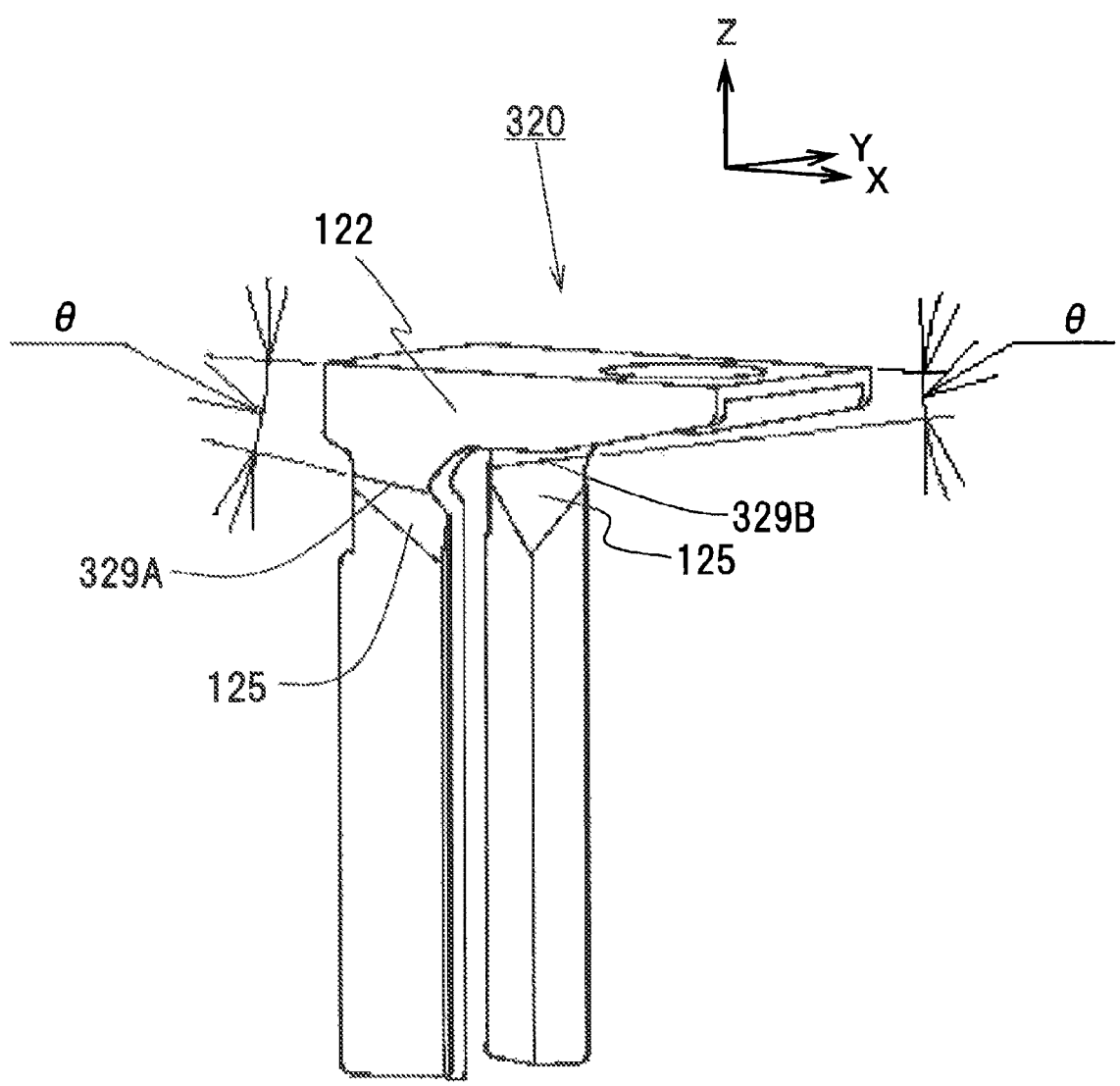
FIG. 13 is a perspective view illustrating an anode electricity collector of a rechargeable battery according to a third embodiment of the present invention.
Figure 14:
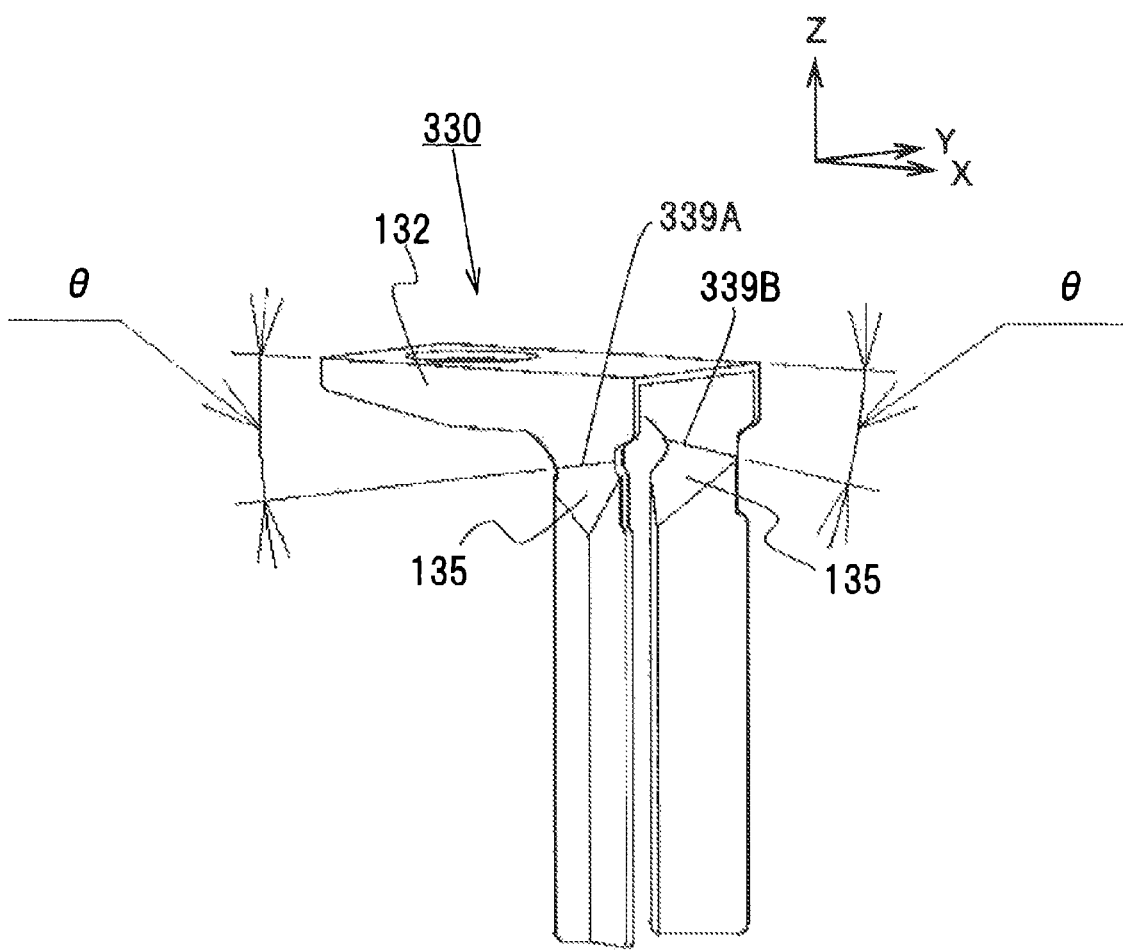
FIG. 14 is a perspective view illustrating a cathode electricity collector of the rechargeable battery according to the third embodiment of the present invention.
Figure 15:
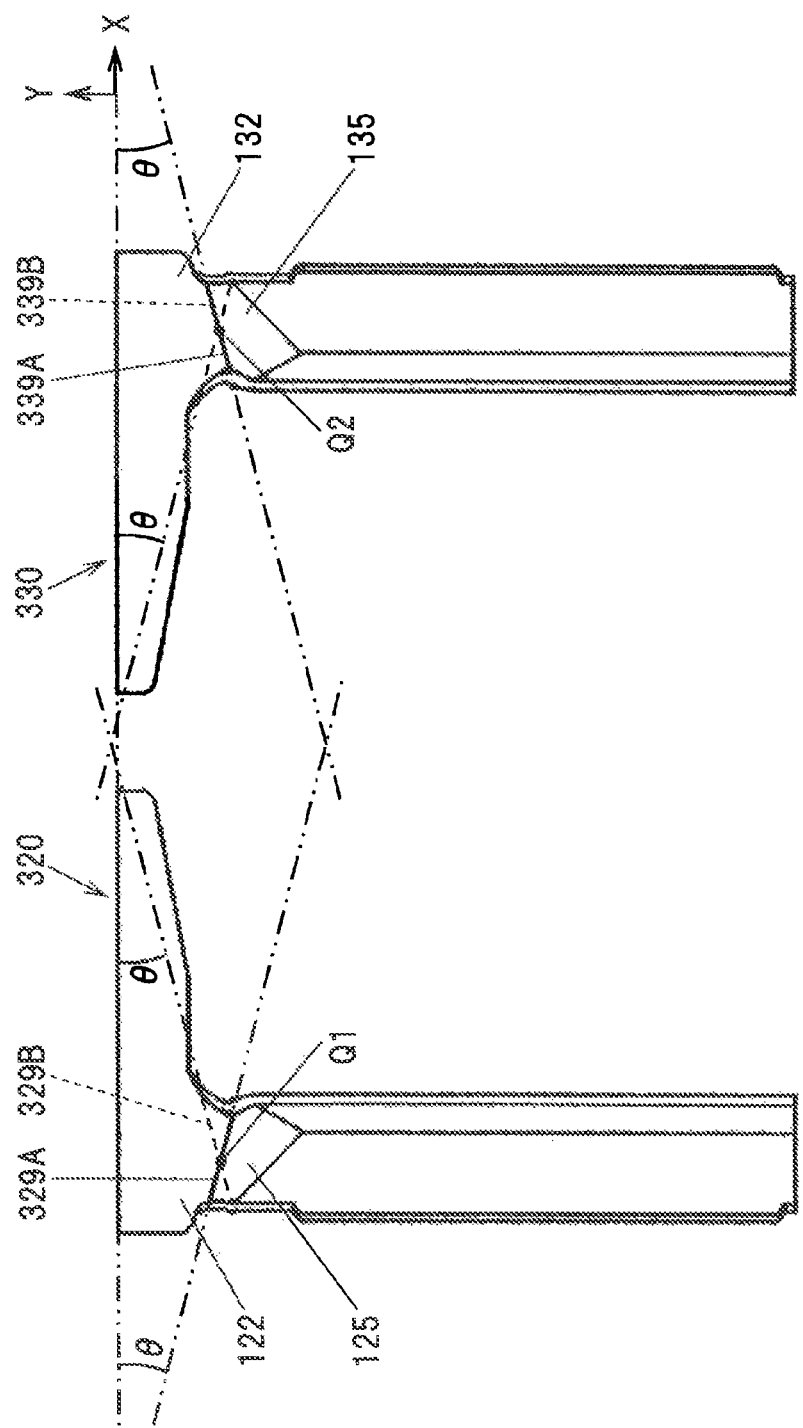
FIG. 15 is a side view of the anode electricity collector of FIG. 13 and the cathode electricity collector of FIG. 14.

Referring now to FIG. 13 through FIG. 15, a rechargeable battery according to a third embodiment will be described FIG. 13 is a perspective view illustrating an anode electricity collector 320 and FIG. 14 is a perspective view illustrating a cathode electricity collector 330 of a rechargeable battery according to the third embodiment of the present invention. FIG. 15 is a side view of the anode electricity collector 320 of FIG. 13 and the cathode electricity collector 330 of FIG. 14. In the drawing, the same or corresponding portions as the first and second embodiments are designated by the same reference signs, and description will be omitted. Hereinafter, points different from the second embodiment will be described in detail.

In the third embodiment, as illustrated in FIG. 13 to FIG. 15, each of first bent sides 329A, 329B, 339A, 339B is provided so as to form a predetermined angle θ with respect to the X-direction, which is the direction of the wound center axis of the lump of the wound electrodes 4.

As illustrated in FIG. 13, the pair of first bent sides 329A, 329B of the pair of coupling plates 125 provided respectively on the anode electricity collector 320 are provided so that the first bent side 329A, which is a boundary between the coupling plate 125 and the connecting plate 122 on the left side when viewing the drawing from the front, and the first bent side 329B, which is a boundary between the coupling plate 125 and the connecting plate 122 on the right side when viewing the drawing from the front, intersect each other at a point Q1 in side view as illustrated in FIG. 15. In the same manner, as illustrated in FIG. 14, the pair of first bent sides 339A, 339B of the pair of coupling plates 135 provided respectively on the cathode electricity collector 330 are provided so that the first bent side 339A, which is a boundary between the coupling plate 135 and the connecting plate 132 on the left side when viewing the drawing from the front, and the first bent side 339B, which is a boundary between the coupling plate 135 and the connecting plate 132 on the right side when viewing the drawing from the front, intersect each other at a point Q2 in side view as illustrated in FIG. 15.

According to the third embodiment, the same effects of the second embodiment are achieved. Furthermore, in the third embodiment, rigidity with respect to the vibrations and impacts in the Y-direction may be enhanced in comparison with the above-described second embodiment in which the pair of first bent sides are provided so as to extend in parallel to the X-direction.

Deformation as shown below is also included in the present invention, and combinations of one or a plurality of the modifications with the above-described embodiments are also applicable.

[Modifications]

Figure 16:
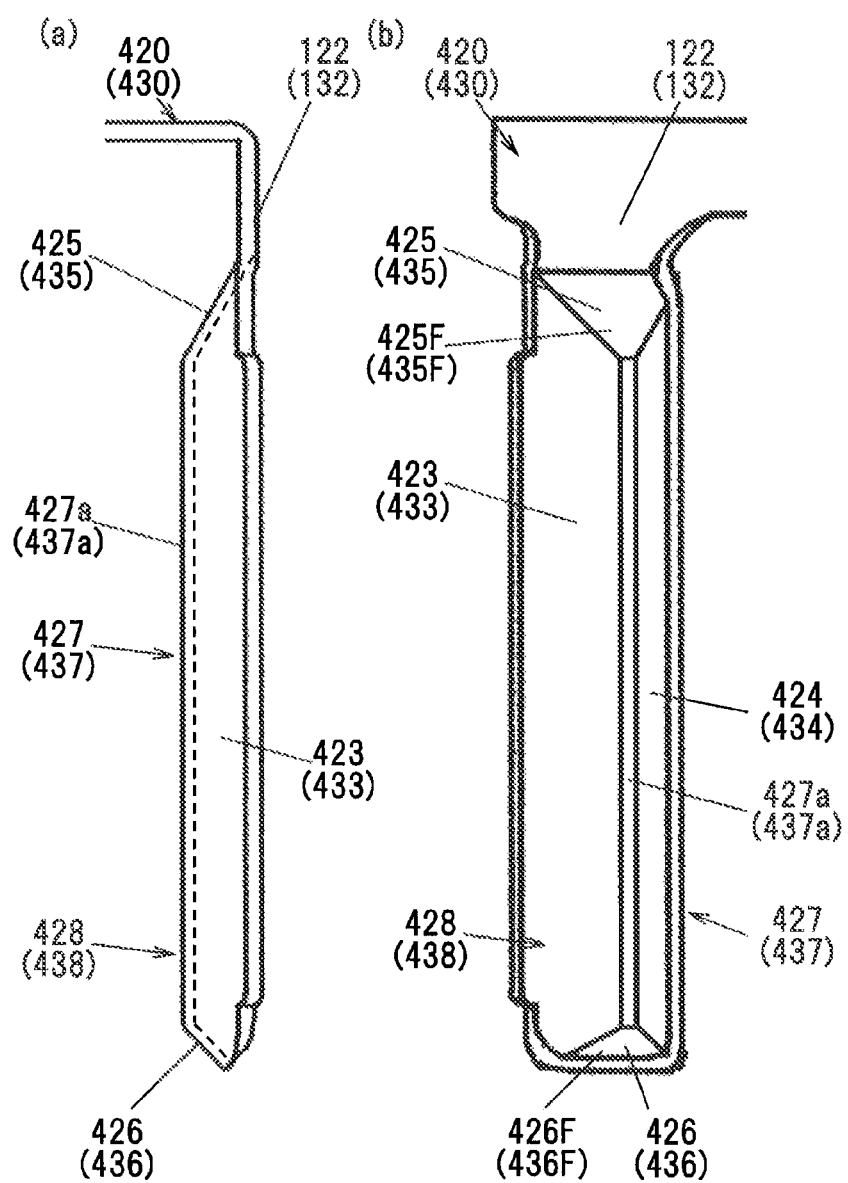
FIG. 16 is a partly enlarged view illustrating a left side surface of an electricity collector, and a partly enlarged view illustrating a front of the electricity collector of a rechargeable battery according to a modification of the present invention.
Figure 17:
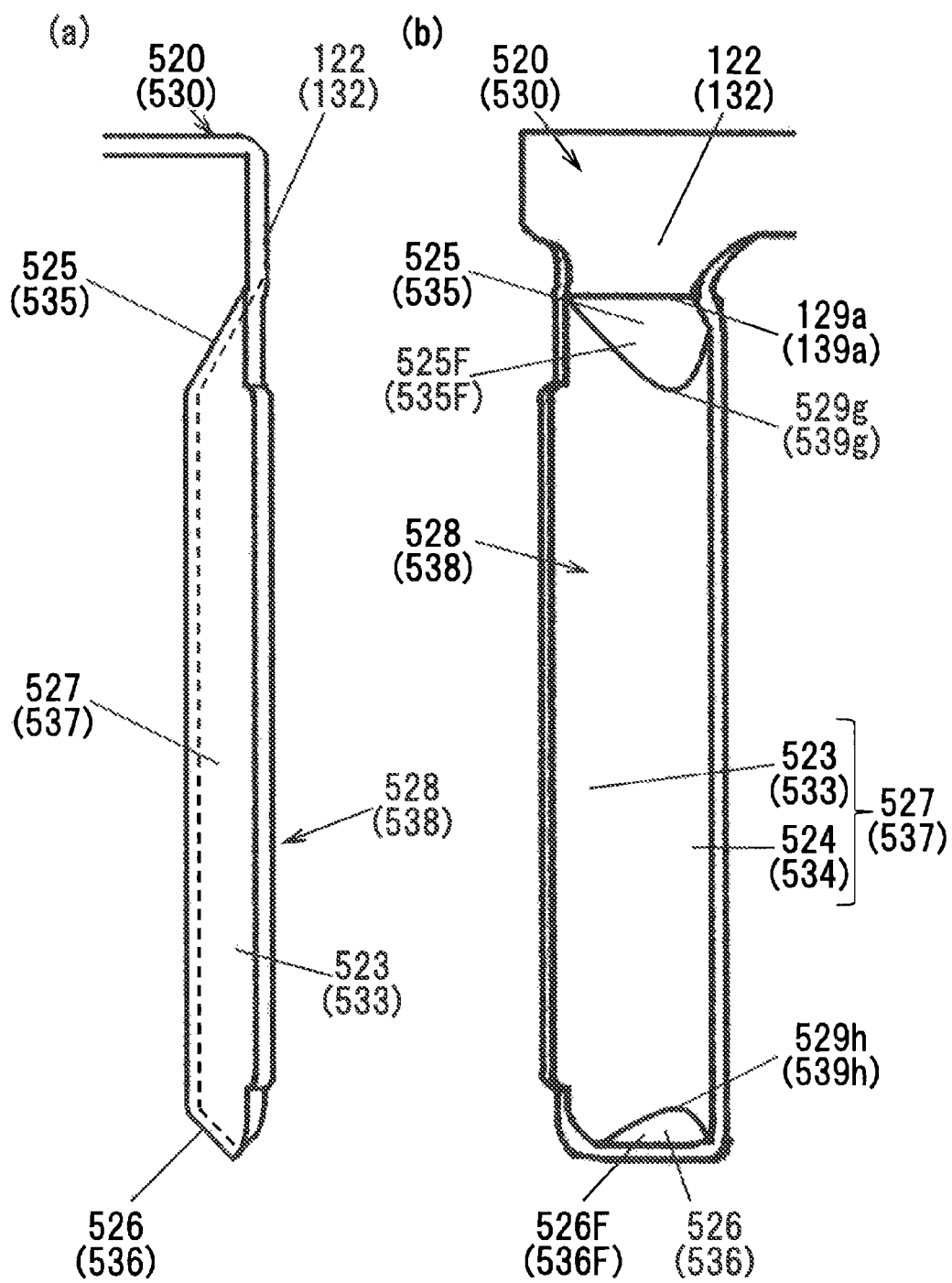
FIG. 17 is a partly enlarged view illustrating a left side surface of the electricity collector, and a partly enlarged view illustrating the front of the electricity collector of the rechargeable battery according to the modification of the present invention.

(1) Although a configuration in which the coupling surfaces 125F, 135F each have the three bent sides has been described in the above-described embodiment, the present invention is not limited thereto. For example, as illustrated in FIG. 16, raising portions 428, 438 may be formed by the raising process so that four bent sides are formed, or raising portions 528, 538 may be formed by the raising process so as to form curved bent sides as illustrated in FIG. 17. FIG. 16 and FIG. 17 are a partly enlarged view illustrating a left side surface of an electricity collector, and a partly enlarged view illustrating the front of the electricity collector of the rechargeable battery according to a modification of the present invention. Although a configuration of the anode electricity collector is illustrated in FIG. 16 and FIG. 17, reference numerals of components of the cathode electricity collector are also added in parentheses for the sake of convenience.

The raising portion 428 of an anode electricity collector 420 illustrated in FIG. 16 includes a joint plate 427 having a substantially U-shape in cross-section, a coupling plate 425 configured to couple the joint plate 427 and the connecting plates 122, and a reinforcing plate 426 provided at an end portion on the bottom surface 11c side of the battery pack 11 of the joint plate 427. The joint plate 427 has a shape depressed so as to protrude toward the center of the lump of the wound electrodes 4 in the thickness direction by a bottom plate 427a extending in parallel to the connecting plate 122 and a main plate 423 and a rib plate 424 inclined from the end sides of the both long sides of the bottom plate 427a toward the wide surfaces 11a side of the battery pack 11. The coupling plate 425 of the anode electricity collector 420 has a substantially trapezoidal coupling surface 425F, and integrally coupling the main plate 423, the rib plate 424, the bottom plate 427a, and the connecting plates 122. The reinforcing plate 426 of the anode electricity collector 420 has a trapezoidal reinforcing surface 426F, and couples the main plate 423, the rib plate 424, and the bottom plate 427a at an end portion of the anode electricity collector 420 on the bottom surface 11c side of the battery pack 11.

In the same manner, the raising portion 438 of a cathode electricity collector 430 illustrated in FIG. 16 includes a joint plate 437 having a substantially U-shape in cross-section, a coupling plate 435 configured to couple the joint plate 437 and the connecting plates 132, and a reinforcing plate 436 provided at an end portion on the bottom surface 11c side of the battery pack 11 of the joint plate 437. The joint plate 437 has a shape depressed so as to protrude toward the center of the lump of the wound electrodes 4 in the thickness direction by a bottom plate 437a extending in parallel to the connecting plate 132 and a main plate 433 and a rib plate 434 inclined from the end sides of the both long sides of the bottom plate 437a toward the wide surfaces 11a side of the battery pack 11. The coupling plate 435 of the cathode electricity collector 430 has a substantially trapezoidal coupling surface 435F, and integrally coupling the main plate 433, the rib plate 434, the bottom plate 437a, and the connecting plates 132. The reinforcing plate 436 of the cathode electricity collector 430 includes has a trapezoidal reinforcing surface 436F, and couples the main plate 433, the rib plate 434, and the bottom plate 437a at an end portion of the cathode electricity collector 430 on the bottom surface 11c side of the battery pack 11.

The raising portion 528 of an anode electricity collector 520 illustrated in FIG. 17 includes a joint plate 527 having a substantially C-shape in cross-section, a coupling plate 525 configured to couple the joint plate 527 and the connecting plates 122, and a reinforcing plate 526 provided at an end portion on the bottom surface 11c side of the battery pack 11 of the joint plate 527. The joint plate 527 of the anode electricity collector 520 has a curved shape along the boundaries with respect to a main plate 523 and a rib plate 524, and has no clear boundary. The coupling plate 525 of the anode electricity collector 520 is provided with a coupling surface 525F having the straight first bent side 129a and a curved bent side 529g. The reinforcing plate 526 of the anode electricity collector 520 has a reinforcing surface 526F having an end side on the bottom surface 11c side of the battery pack 11 and a curved bent side 529h.

In the same manner, the raising portion 538 of a cathode electricity collector 530 illustrated in FIG. 17 includes a joint plate 537 having a substantially C-shape in cross-section, a coupling plate 535 configured to couple the joint plate 537 and the connecting plates 132, and a reinforcing plate 536 provided at an end portion on the bottom surface 11c side of the battery pack 11 of the joint plate 537. The joint plate 537 of the cathode electricity collector 530 has a curved shape along the boundaries with respect to a main plate 533 and a rib plate 534, and has no clear boundary. The coupling plate 535 of the cathode electricity collector 530 is provided with a coupling surface 535F having the straight first bent side 139a and a curved bent side 539g. The reinforcing plate 536 of the cathode electricity collector 530 has a reinforcing surface 536F having an end side on the bottom surface 11c side of the battery pack 11 and a curved bent side 539h.

(2) In the above-described embodiment, the shape of the battery container is a square shape. However, the present invention is not limited thereto. A flat battery container having an oval shape in cross section is also applicable, and various types of thin-profile battery container configured to seal the opening of the battery pack with the battery lid may be employed.

(3) The lithium ion rechargeable battery has been described as an example. However, the present invention may be applied to other rechargeable batteries such as nickel hydride battery.

(4) The materials of the anode external terminal, the anode electricity collector, and the foil of the anode are not limited to aluminum, and may be aluminum alloy. The materials of the cathode external terminal, the cathode electricity collector, and the foil of the cathode are not limited to copper, and may be copper alloy.

Although various embodiments and modifications have been described above, the present invention is not limited to the contents of these examples. Other modes conceivable within the technical idea of the present invention are also included within the scope of the present invention.

Entire contents of disclosure in the following basic application for claiming the benefit of priority is incorporated herein by reference.

Japanese Patent Application No. 2011-140524 (filed Jun. 24, 2011).

The invention claimed is:

1. A rechargeable battery comprising:
a lump of flat electrodes formed by winding an electrode;
a battery pack configured to accommodate the lump of the flat electrodes;
a battery lid configured to seal the battery pack;
an external terminal provided on the battery lid;
an electricity collector configured to connect the electrode and the external terminal; and
laminated portions of the electrode at both end portions of the lump of the flat electrodes in a direction of a wound center axis are separated into two bundle electrode connecting portions from a center side of the thickness direction of the lump of the flat electrodes outward of the battery pack,
the electricity collector includes:
a pair of joint plates each including a main plate having an electricity collector joint surface to be joined to each of electrode joint surfaces provided on the separated two bundle electrode connecting portions and a rib plate bent from the main plate and extending outward of the battery pack;
a mounting plate extending along an inner surface of the battery lid;
a pair of connecting plates bent from side portions of the mounting plate and extending toward a bottom surface of the battery pack; and
a pair of coupling plates configured to couple the pair of connecting plates and the pair of joint plates, respectively, wherein the each one of the pair of coupling plates inclines from one end of the each of the connecting plates toward a center of the lump of the flat electrodes in the thickness direction, simultaneously extends toward the bottom surface of the battery pack, and is coupled to the one end of each of the pair of joint plates.

2. The rechargeable battery according to claim 1, wherein the coupling plate includes a coupling surface having three bent sides, is continued to one end of the connecting plate on a first bent side, and is continued to a main plate and a rib plate of the joint plate respectively on a second bent side and a third bent side.

3. The rechargeable battery according to claim 2, wherein a boundary between the main plate and the rib plate on the coupling surface side corresponds to a fourth bent side, the second, third, and fourth bent sides intersect each other at a point apart from the connecting plate toward the center of the lump of the flat electrodes in the thickness direction by a predetermined distance and also apart from one end of the connecting plate toward the bottom surface of the battery pack by a predetermined distance, and the second, third, and fourth bent sides form a Y-shape in side view.

4. The rechargeable battery according to claim 2, wherein the first bent side is provided so as to form a predetermined angle with the direction of wound center axis of the lump of the flat electrodes, the first bent sides of the pair of coupling plates provided on the electricity collector are provided so that the first bent sides of the pair of the coupling plates intersect each other in side view.

5. The rechargeable battery according to claim 3, wherein the first bent side is provided so as to form a predetermined angle with the direction of wound center axis of the lump of the flat electrodes, the first bent sides of the pair of coupling plates provided on the electricity collector are provided so that the first bent sides of the pair of the coupling plates intersect each other in side view.

6. The rechargeable battery according to claim 1, wherein a reinforcing plate configured to couple the main plate and the rib plate is provided at the end portion of the electricity collector on the bottom surface side of the battery pack.

7. The rechargeable battery according to claim 2, wherein a reinforcing plate configured to couple the main plate and the rib plate is provided at the end portion of the electricity collector on the bottom surface side of the battery pack.

8. The rechargeable battery according to claim 3, wherein a reinforcing plate configured to couple the main plate and the rib plate is provided at the end portion of the electricity collector on the bottom surface side of the battery pack.

9. The rechargeable battery according to claim 4, wherein a reinforcing plate configured to couple the main plate and the rib plate is provided at the end portion of the electricity collector on the bottom surface side of the battery pack.

10. The rechargeable battery according to claim 5, wherein a reinforcing plate configured to couple the main plate and the rib plate is provided at the end portion of the electricity collector on the bottom surface side of the battery pack.

11. The rechargeable battery according to claim 1, wherein the electricity collector is connected to the external terminal on the other end side of the connecting plate.

12. The rechargeable battery according to claim 2, wherein the electricity collector is connected to the external terminal on the other end side of the connecting plate.

13. The rechargeable battery according to claim 3, wherein the electricity collector is connected to the external terminal on the other end side of the connecting plate.

14. The rechargeable battery according to claim 4, wherein the electricity collector is connected to the external terminal on the other end side of the connecting plate.

15. The rechargeable battery according to claim 5, wherein the electricity collector is connected to the external terminal on the other end side of the connecting plate.

\* \* \* \* \*